United States Patent
Nakamura et al.

(10) Patent No.: US 10,477,379 B2
(45) Date of Patent: Nov. 12, 2019

(54) INFORMATION PROCESSING DEVICE FOR PROVIDING SERVICE OF SEARCH BEACON, METHOD FOR PROVIDING SERVICE OF SEARCH FOR BEACON, NON-TRANSITORY COMPUTER-READABLE STORAGE MEDIUM, AND INFORMATION PROCESSING SYSTEM FOR PROVIDING SERVICE OF SEARCH FOR BEACON

(71) Applicant: FUJITSU LIMITED, Kawasaki-shi, Kanagawa (JP)

(72) Inventors: Yosuke Nakamura, Kawasaki (JP); Kazuaki Nimura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 155 days.

(21) Appl. No.: 15/458,160

(22) Filed: Mar. 14, 2017

(65) Prior Publication Data
US 2017/0339517 A1    Nov. 23, 2017

(30) Foreign Application Priority Data
May 18, 2016    (JP) ................................. 2016-099495

(51) Int. Cl.
*H04W 24/00*    (2009.01)
*H04W 8/00*    (2009.01)
(Continued)

(52) U.S. Cl.
CPC ............. *H04W 8/005* (2013.01); *H04W 4/02* (2013.01); *H04W 40/244* (2013.01)

(58) Field of Classification Search
CPC ....... H04W 4/02; H04W 40/244; H04W 4/00; H04W 4/80; H04W 4/029; H04W 8/005;
(Continued)

(56) References Cited

U.S. PATENT DOCUMENTS 8,750,262 B2 *   6/2014   Laroia ................... H04L 5/0035
                                                              370/338
9,516,473 B1 *   12/2016  Haapanen ............. H04W 4/029
                         (Continued)

FOREIGN PATENT DOCUMENTS

CN    104105083 A  *  10/2014  ............ H04W 8/005
CN    104144497 A  *  11/2014
                 (Continued)

OTHER PUBLICATIONS

Recruit Sumai Company Ltd. "Starting demonstration tests of child watching service utilizing beacons", Press Release (Sep. 2, 2015), URL <http://www.recruit-sumai.co.jp/press/150902_SUUMO_mimamoriservice.pdf> (3 pages).

*Primary Examiner* — Mahendra R Patel
(74) *Attorney, Agent, or Firm* — Fujitsu Patent Center

(57) ABSTRACT

An information processing device receives detection information including a position of a first terminal device corresponding to a position where the first terminal device detects a beacon signal sent from a given beacon device, if no detection information is received from any of a plurality of terminal devices for a given time or more, specifies peripheral equipment based on a storage configured to store position information of the peripheral equipment being present in a position beyond an area where at least one of the plurality of the terminal devices receives the beacon signal if the beacon device is present, notifies coupling information on the specified peripheral equipment to a second terminal device being present in a position communicable with the specified peripheral equipment, obtains first information from the specified peripheral equipment via the second terminal device, and transmits the first information to a given device.

20 Claims, 27 Drawing Sheets

(51) Int. Cl.
*H04W 4/02* (2018.01)
*H04W 40/24* (2009.01)

(58) Field of Classification Search
CPC ... H04W 64/00; G08B 13/24; G08B 13/2462; G01S 3/02; G06Q 10/109
USPC .......................................... 455/456.1; 342/458
See application file for complete search history.

(56) References Cited

U.S. PATENT DOCUMENTS

| | | | |
|---|---|---|---|
| 2004/0147223 A1* | 7/2004 | Cho | H04L 12/66 455/41.2 |
| 2011/0039495 A1* | 2/2011 | Sawai | H04W 52/16 455/62 |
| 2013/0335273 A1* | 12/2013 | Pakzad | G01C 21/206 342/458 |
| 2014/0229224 A1* | 8/2014 | Appel | G06Q 10/06315 705/7.25 |
| 2014/0315591 A1* | 10/2014 | Ukita | H04W 48/16 455/510 |
| 2015/0334676 A1* | 11/2015 | Hart | H04W 4/029 455/456.1 |
| 2015/0355308 A1* | 12/2015 | Ishida | H04W 4/00 455/456.1 |
| 2015/0364037 A1* | 12/2015 | Lee | G08C 23/02 348/158 |
| 2016/0323708 A1* | 11/2016 | Sahadi | H04W 4/023 |
| 2017/0251340 A1* | 8/2017 | Sanders | H04W 4/06 |
| 2017/0289750 A1* | 10/2017 | Haapanen | H04W 4/80 |
| 2018/0143286 A1* | 5/2018 | Ikezaki | G01S 5/14 |

FOREIGN PATENT DOCUMENTS

| | | | | |
|---|---|---|---|---|
| JP | 2015-103917 | 6/2015 | | |
| JP | 2015-528897 | 10/2015 | | |
| WO | WO-2016035929 A1 * | 3/2016 | ............ | H04W 4/08 |

* cited by examiner

FIG. 6

| PERIPHERAL EQUIPMENT INFORMATION | OBTAINABLE DATA | POSITION INFORMATION |
|---|---|---|
| FIXED CAMERA a | VIDEO | (x1,y1) |
| FIXED CAMERA b | VIDEO | (x2,y2) |
| FIXED CAMERA c | VIDEO | (x3,y3) |
| FIXED CAMERA d | VIDEO | (x4,y4) |
| FIXED CAMERA e | VIDEO | (x5,y5) |
| FIXED CAMERA f | VIDEO | (x6,y6) |
| FIXED CAMERA g | VIDEO | (x7,y7) |
| FIXED CAMERA h | VIDEO | (x8,y8) |
| FIXED CAMERA i | VIDEO | (x9,y9) |
| FIXED CAMERA j | VIDEO | (x10,y10) |
| ⋮ | ⋮ | ⋮ |

| DETECTION TIME INFORMATION | BEACON ID | POSITION INFORMATION |
|---|---|---|
| MARCH 8 12:05 | A | (x6,y6) |
| MARCH 8 12:07 | B | (x5,y5) |
| MARCH 8 12:10 | C | (x4,y4) |
| ⋮ | ⋮ | ⋮ |

| TERMINAL ID | DETECTION TIME INFORMATION | BEACON ID | POSITION INFORMATION |
|---|---|---|---|
| SMARTPHONE ID 1 | MARCH 8 12:05 | A | (x6,y6) |
| SMARTPHONE ID 1 | MARCH 8 12:07 | A | (x5,y5) |
| SMARTPHONE ID 1 | MARCH 8 12:10 | A | (x4,y4) |
| SMARTPHONE ID 2 | MARCH 8 12:04 | A | (x9,y9) |
| SMARTPHONE ID 2 | MARCH 8 12:07 | A | (x8,y8) |
| SMARTPHONE ID 2 | MARCH 8 12:11 | A | (x7,y7) |
| ⋮ | ⋮ | ⋮ | ⋮ |

312

INFORMATION PROCESSING DEVICE FOR PROVIDING SERVICE OF SEARCH BEACON, METHOD FOR PROVIDING SERVICE OF SEARCH FOR BEACON, NON-TRANSITORY COMPUTER-READABLE STORAGE MEDIUM, AND INFORMATION PROCESSING SYSTEM FOR PROVIDING SERVICE OF SEARCH FOR BEACON

CROSS-REFERENCE TO RELATED APPLICATION

This application is based upon and claims the benefit of priority of the prior Japanese Patent Application No. 2016-099495, filed on May 18, 2016, the entire contents of which are incorporated herein by reference.

FIELD

The embodiments discussed herein are related to an information processing device, a method, a non-transitory computer-readable storage medium, and an information processing system.

BACKGROUND

With the spread of smart phones (hereinafter referred to as "smartphones") and improvements in power saving in wireless communication, a position search service system for detecting for the position of a detection target such as a child, an elderly person or a pet has been proposed which uses a wireless beacon device (hereinafter referred to as a "beacon device") and smartphones. For example, a system has been proposed in which a target desired to be searched for such as a child is made to carry a power saving wireless beacon device, and smartphones of third parties which smartphones have a search application installed thereon detect the beacon device. In this system, smartphone position information when a smartphone group registered in advance detects a beacon signal may be sent to a user terminal of a protector or the like.

Examples of the related art include Japanese National Publication of International Patent Application No. 2015-528897, Japanese Laid-open Patent Publication No. 2015-103917, and Recruit Sumai Company Ltd. "Starting demonstration tests of child watching service utilizing beacons" (Sep. 2, 2015) URL http://www.recruit-sumai.co.jp/press/150902_SUUMO_mimamoriservice.pdf.

SUMMARY

According to an aspect of the embodiments, an information processing device for providing service of search for a beacon device includes: a memory; a processor coupled to the memory and configured to execute a reception processing that includes receiving detection information, the detection information including a position of a first terminal device, the position of the first terminal device corresponding to a position where the first terminal device detects a beacon signal sent from a given beacon device, the first terminal device being any of a plurality of terminal devices configured to detect the beacon signal, execute a specification processing that includes, if no detection information is received from any of the plurality of the terminal devices for a given time or more, specifying peripheral equipment based on a storage configured to store position information of the peripheral equipment, the peripheral equipment being present in a position beyond an area where at least one of the plurality of the terminal devices receives the beacon signal if the beacon device is present, execute a notification processing that includes notifying coupling information on the specified peripheral equipment to a second terminal device among the plurality of the terminal devices, the second terminal device being present in a position communicable with the specified peripheral equipment, and execute a transmission processing that includes obtaining first information from the specified peripheral equipment via the second terminal device and transmitting the first information to a given device, the second terminal device being coupled to the specified peripheral equipment based on the coupling information on the peripheral equipment.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an example of a peripheral equipment information table according to one embodiment;

FIG. 7 is a diagram illustrating an example of a detection information accumulation table according to one embodiment;

FIG. 10 is a diagram illustrating an example of a detection information table according to one embodiment;

DESCRIPTION OF EMBODIMENTS

It may be difficult to search for the detection target when the detection target has moved to a place where it is difficult for the smartphone group to detect the beacon signal. The accuracy of search for the detection target may be improved when the detection target may be detected from video obtained by equipment (peripheral equipment) presents in the vicinity of a smartphone or the like in order to detect the position of the detection target.

However, it is difficult to determine what equipment is the peripheral equipment to be used other than smartphones. For example, when a considerable number of pieces of equipment other than smartphones are used indiscriminately, unnecessary wireless communication occurs and results in an increased load on a network, or unnecessary processing occurs and results in poor efficiency. On the other hand, making the owner of a smartphone select the equipment to be used other equipment than smartphones is a burden to the owner.

As one aspect of the present embodiment, provided are solutions for being able to improve the accuracy of search for a detection target carrying a beacon device.

Embodiments of the present technology will hereinafter be described with reference to the accompanying drawings. Incidentally, in the present specification and the drawings, constituent elements including essentially identical functional configurations are identified by the same reference symbols, and thereby repeated description will be omitted.

Figure 1:
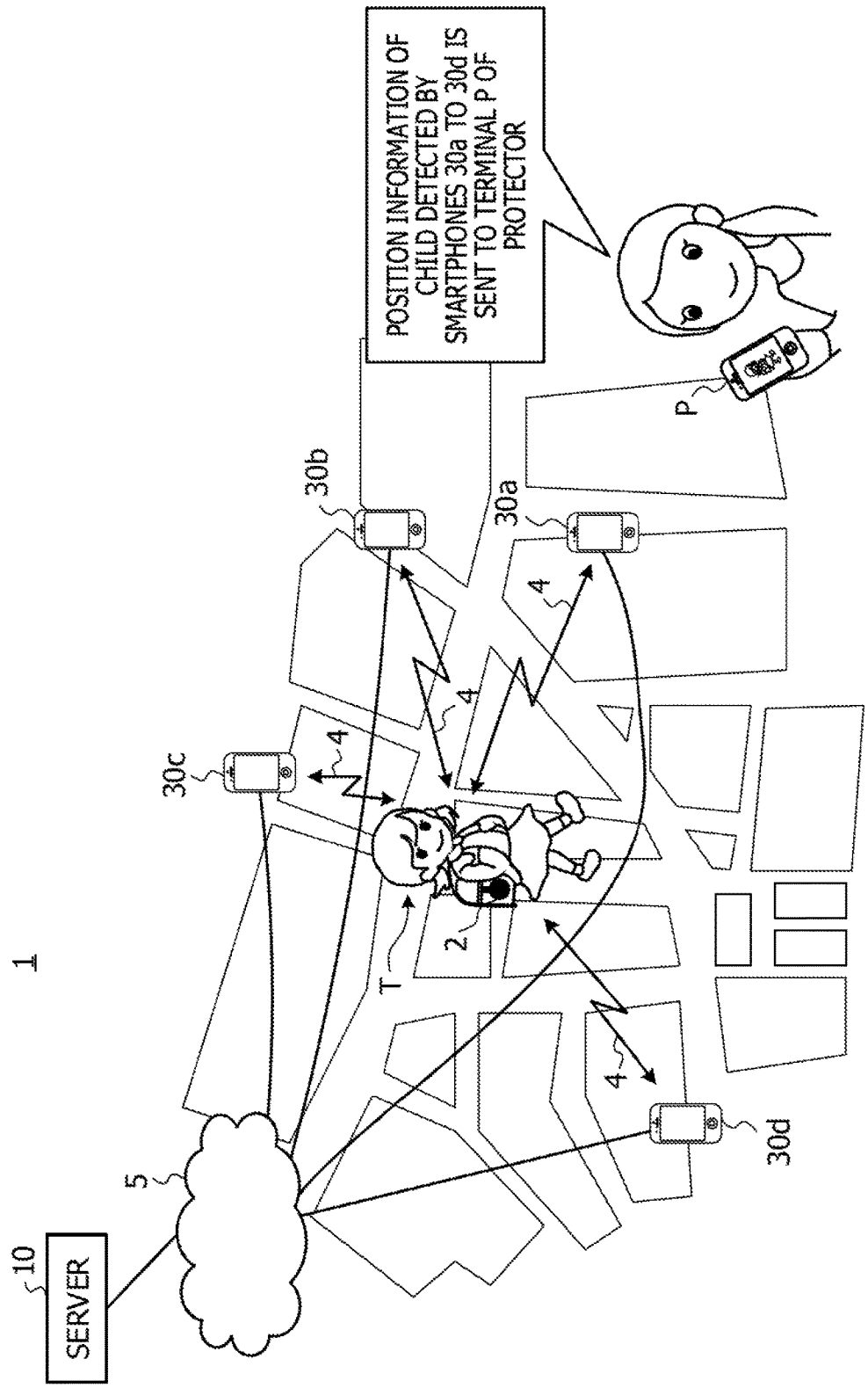
FIG. 1 is a diagram illustrating an example of a detecting system according to one embodiment.

An example of entire configuration of a detecting system 1 according to one embodiment of the present technology will first be described with reference to FIG. 1. The detecting system 1 according to the present embodiment includes a beacon device 2, a first smartphone 30a, a second smartphone 30b, a third smartphone 30c, a fourth smartphone 30d, a server 10, and a user terminal P.

The first smartphone 30a, the second smartphone 30b, the third smartphone 30c, and the fourth smartphone 30d are an example of a smartphone group that detects the position of the beacon device 2 carried by a detection target T. The smartphone group exemplified by the first smartphone 30a, the second smartphone 30b, the third smartphone 30c, and the fourth smartphone 30d will hereinafter be collectively referred to also as a smartphone 30. The smartphone 30 has a search application installed thereon in advance, the search application being for transmitting position information of the smartphone 30 to the server 10 at a time of reception of a beacon signal of the beacon device 2 when there is a request to transmit detection information from the server 10. The smartphone 30 registers a smartphone identification (ID) with the server 10 when installing the search application. Incidentally, the smartphone 30 is an example of terminal equipment. The terminal equipment may be any mobile equipment including tablet terminals, personal digital assistants (PDAs), mobile telephones, portable music reproducing devices, portable video processing devices, portable game machines, and wearable display devices such as head mounted displays (HMDs) as long as the terminal equipment has a position detecting function such as that of a global positioning system (GPS).

The server 10 accepts a request to search for the beacon device 2 from the user terminal P via a network 5. The server 10 searches for the detection target T such as a child carrying the beacon device 2 by using the beacon device 2 and the smartphone 30, and estimates the position of the detection target T. For example, when the server 10 accepts the search request from the user terminal P, the server 10 requests the smartphone 30 to transmit detection information. When the smartphone 30 receives the beacon signal (wireless signal) 4 sent from the beacon device 2, the smartphone 30 transmits, to the server 10, detection information indicating position information of the smartphone 30 which position information is obtained from the GPS at a point in time of the reception of the beacon signal. The server 10 accumulates the detection information received from the smartphone 30, and estimates the position of the detection target based on those pieces of information.

The user terminal P is an example of equipment for search request that registers a beacon ID of the beacon device 2 carried by the detection target T with the server 10 in advance in order to request the server 10 to search for the detection target T.

The beacon device 2 is attached to a child, an elderly person, a pet, or the like. An example of the user who makes the request to search for the detection target T is a protector of the child to whom the beacon device 2 is attached. The user terminal P may be electronic equipment having a communicating function, such as a terminal, a personal computer (PC) or a tablet terminal that is operated by a parent of the child, an owner of the pet, or a caregiver for the elderly person. The user terminal P transmits the request to search for the beacon device 2 to the server 10.

Figure 2B:
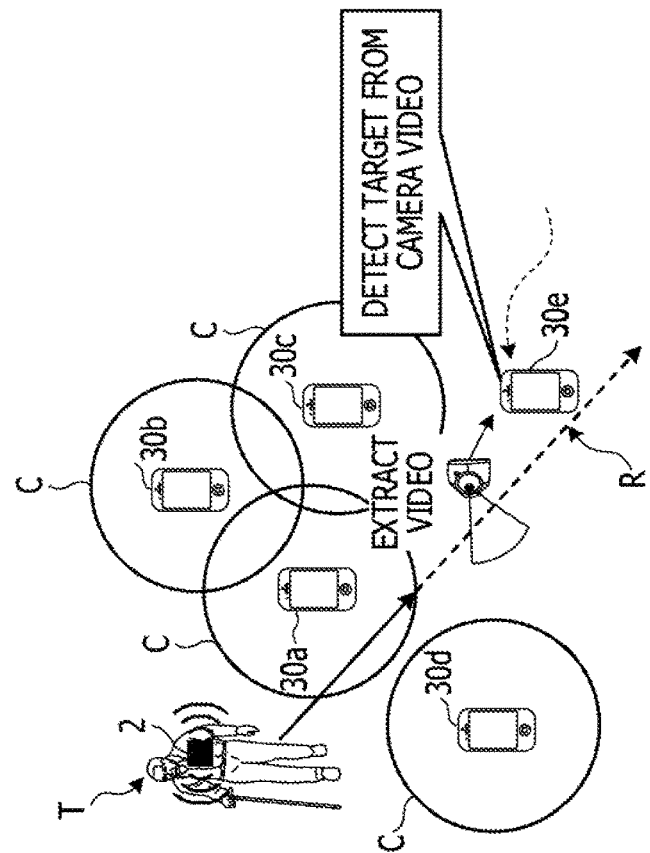
FIGS. 2A and 2B are diagrams illustrating an example of position estimation by a detecting system according to one embodiment.
Figure 2A:
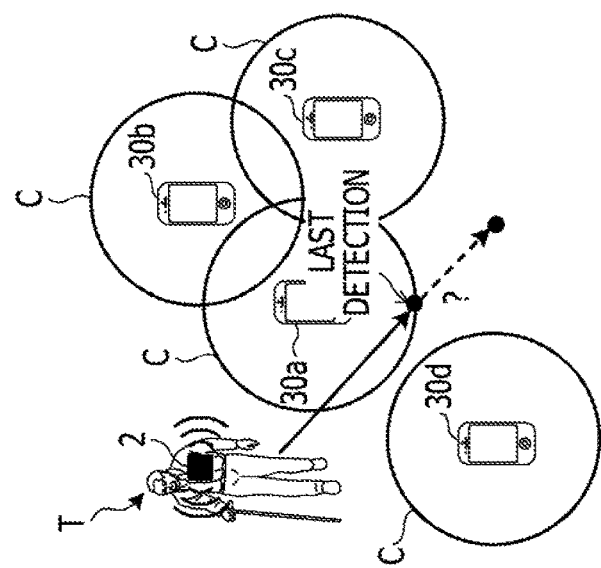

As illustrated in FIG. 2A, when the detection target T has moved to an area where it is difficult for the smartphone 30 to detect the detection target T, it is difficult for the smartphone 30 to receive the beacon signal, and thus difficult to obtain detection information. Therefore, no detection information is sent to the server 10.

On the other hand, the accuracy of search for the detection target T carrying the beacon device 2 may be improved when equipment presents in the vicinity of the estimated position of the detection target T (position of the beacon device 2), the equipment being other than the smartphone 30, is utilized (the equipment will hereinafter be referred to as "peripheral equipment"). As an example, as illustrated in FIG. 2B, when the detection target T has moved along a route R and presents outside a range C in which the smartphone 30 may receive the beacon signal, and peripheral equipment (fixed camera or the like) within a given range of the estimated position of the beacon device 2 may communicate with the smartphone 30, the smartphone 30 may transmit video data obtained by the peripheral equipment to the server 10. When the smartphone 30 thus transmits utilizable information other than the detection information obtained by the own device to the server 10, the accuracy of search for the detection target T may be improved. For example, the detecting system 1 according to the present embodiment may track the detection target T based on the information obtained from the smartphone 30 and the information obtained from the peripheral equipment by making the smartphone 30 and the peripheral equipment cooperate with each other. The accuracy of search for the detection target T may consequently be improved.

Incidentally, the search application may be installed also on the user terminal P, and the user terminal P may be made to function as a smartphone 30. In addition, the server 10 is an example of an information processing device that provides the service of searching for the detection target T carrying the beacon device 2.

First Embodiment

A detecting system 1 according to a first embodiment will first be described.

An example of functional configuration of each piece of equipment including a server 10, a smartphone 30, and a user terminal P in the detecting system 1 according to the first embodiment will be described with reference to FIG. 3. The user terminal P includes a beacon registering unit 7 and a search requesting unit 8. The beacon registering unit 7 registers a beacon ID of a beacon device 2 as a search target in advance. The search requesting unit 8 requests the server 10 to search for the beacon device 2 having the given beacon ID registered in advance in response to a user operation.

The server 10 includes a storage unit 11, an accepting unit 12, a detection information determining unit 13, a detection range determining unit 14, a target position estimating unit 15, a peripheral equipment specifying unit 16, a notifying unit 17, a transmitting unit 18, and a receiving unit 19.

The storage unit 11 stores a user-beacon associating information table 111, a smartphone registration information table 112, a peripheral equipment information table 113, a detection information accumulation table 114, and a position information table 115.

Figure 4:
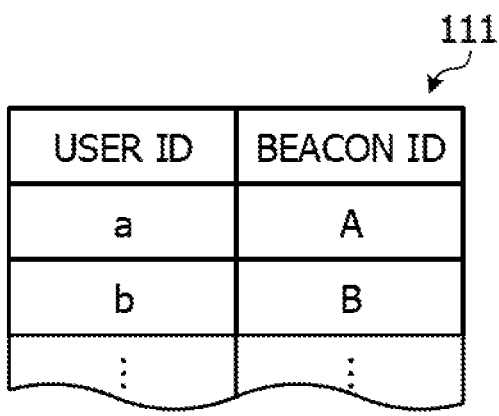
FIG. 4 is a diagram illustrating an example of a user-beacon associating information table according to one embodiment.

FIG. 4 illustrates an example of the user-beacon associating information table 111 according to one embodiment. The user-beacon associating information table 111 stores user IDs and beacon IDs in association with each other. The user IDs may be unique IDs set for respective users, or may be IDs unique to user terminals, such as product numbers of the user terminals P. For example, the ID of a beacon device 2 carried by a detection target T for each user terminal P using the detecting system 1 is registered in the user-beacon associating information table 111.

Figure 5:
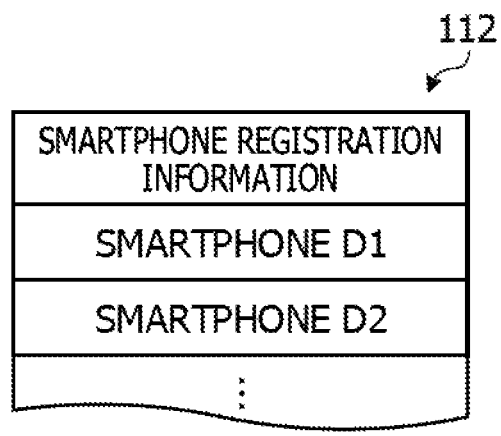
FIG. 5 is a diagram illustrating an example of a smartphone registration information table according to one embodiment.

FIG. 5 illustrates an example of the smartphone registration information table 112 according to one embodiment. The smartphone registration information table 112 according to the present embodiment stores smartphone registration information of smartphones that have the search application installed thereon in advance and have completed registration with the present detecting system 1. It suffices for the smartphone registration information to be information that may identify the smartphones. The smartphone registration information may be the IDs of the smartphones, for example.

FIG. 6 illustrates an example of the peripheral equipment information table 113 according to one embodiment. The peripheral equipment information table 113 stores utilizable peripheral equipment information, obtainable data, and position information in association with each other. In FIG. 6, fixed cameras are illustrated as utilizable peripheral equipment information. The obtainable data in this case is video information. However, the peripheral equipment information is not limited to this. Microphones may be illustrated as another example. The obtainable data in this case is audio information.

FIG. 7 illustrates an example of the detection information accumulation table 114 according to one embodiment. The detection information accumulation table 114 accumulates detection information detected by the smartphone 30. In FIG. 7, the detection information accumulation table 114 stores detection time information, beacon IDs, and position information of the beacon devices 2 in association with each other. The detection information accumulation table 114 may store, for each piece of detection information, the smartphone ID of a smartphone that detected the detection information.

Figure 8:
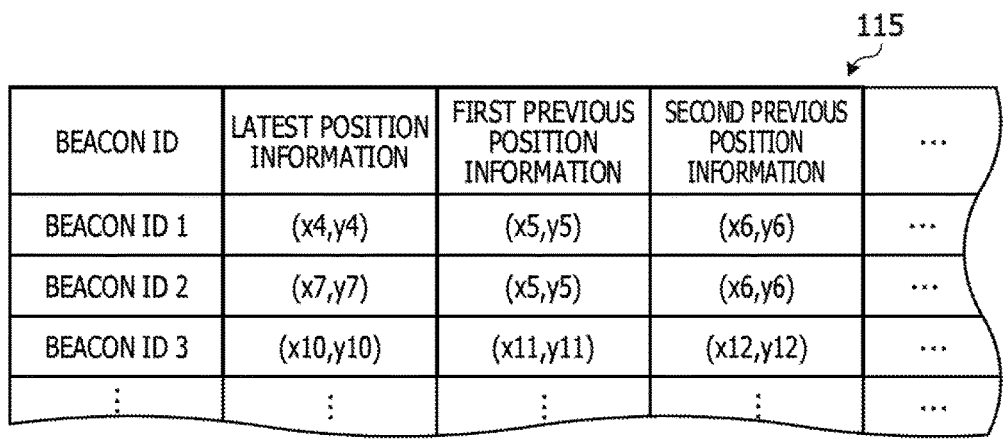
FIG. 8 is a diagram illustrating an example of a position information table according to one embodiment.

FIG. 8 illustrates an example of the position information table 115 according to one embodiment. The position information table 115 stores history information of estimated position information (latest position information, first previous position information, second previous position information, . . . ) in association with each beacon ID.

Returning to FIG. 3, the accepting unit 12 accepts a request to search for the beacon device 2 from the user terminal P. The detection information determining unit 13 determines whether no detection information has been received from a plurality of smartphones 30 for a given time. The detection range determining unit 14 determines a range detectable by the plurality of smartphones 30 during a search request.

The target position estimating unit 15 estimates the position of the beacon device 2 from the detection information about the beacon device 2, the detection information being stored in the detection information accumulation table 114. The peripheral equipment specifying unit 16 specifies peripheral equipment utilizable for search from ranges C in which the respective smartphones 30 may detect the beacon signal and the estimated position information of the detection target T. For example, when no detection information has been received from the plurality of smartphones 30 for a given time or more, the peripheral equipment specifying unit 16 refers to the peripheral equipment information table 113 of the storage unit 11, the peripheral equipment information table 113 storing the position information of peripheral equipment, and specifies peripheral equipment presents at a position where it is difficult for the smartphones 30 to detect the beacon signal.

The transmitting unit 18 obtains information (video information or the like) obtained by the peripheral equipment from a smartphone 30 coupled to the peripheral equipment based on coupling information of the peripheral equipment, and transmits the information to the user terminal P as a source of the request to search for the beacon device 2.

The notifying unit 17 notifies the coupling information of the peripheral equipment and obtainable data to the smartphone 30 that may communicate with the specified peripheral equipment among the plurality of smartphones 30. The receiving unit 19 receives detection information from at least one of the plurality of smartphones 30.

The smartphone 30 includes a storage unit 31, a beacon detecting unit 32, a peripheral equipment detecting unit 33, an equipment accumulated information obtaining unit 34, a transmitting unit 35, a receiving unit 36, and a display unit 37. The storage unit 31 stores a detection beacon list table 311, a detection information table 312, and a couplable peripheral equipment information table 313.

Figure 9:
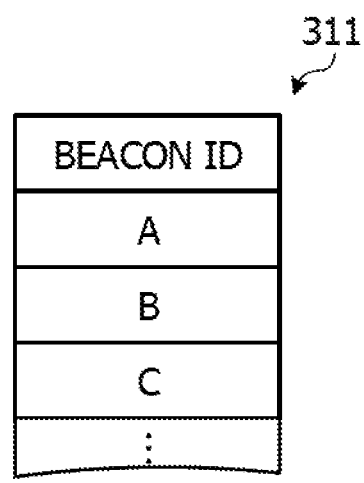
FIG. 9 is a diagram illustrating an example of a detection beacon list table according to one embodiment.

FIG. 9 illustrates an example of the detection beacon list table 311 according to one embodiment. The detection beacon list table 311 stores beacon IDs for which a detection request is received from the server 10.

FIG. 10 illustrates an example of the detection information table 312 according to one embodiment. The detection information table 312 stores pieces of detection information detected by each smartphone 30 in association with each other. An example of the detection information detected by each smartphone 30 includes a terminal ID, detection time information, a beacon ID, and position information.

Figure 11:
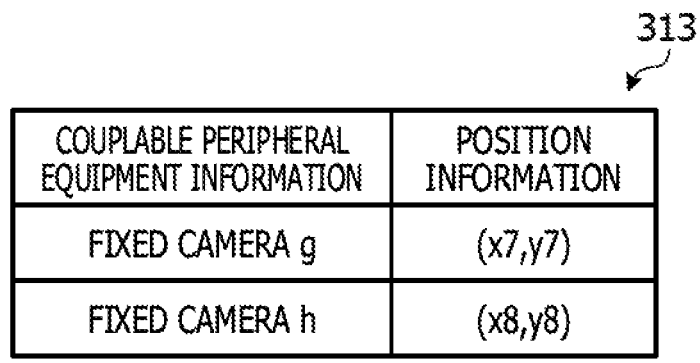
FIG. 11 is a diagram illustrating an example of a couplable peripheral equipment information table according to one embodiment.

FIG. 11 illustrates an example of the couplable peripheral equipment information table 313 according to one embodiment. The couplable peripheral equipment information table 313 retains information about couplable peripheral equipment for each smartphone among pieces of peripheral equipment specified by the server 10. The couplable peripheral equipment information table 313 stores the couplable peripheral equipment information and position information in association with each other.

Returning to FIG. 3, the beacon detecting unit 32 detects the beacon signal of the beacon device 2 of the detection target T. The peripheral equipment detecting unit 33 detects another smartphone 30 or peripheral equipment. The equipment accumulated information obtaining unit 34 obtains utilizable information (video information or the like) other than detection information from peripheral equipment.

The transmitting unit 35 couples to the server 10 wirelessly, another smartphone 30, peripheral equipment, or the like, and transmits various kinds of data. For example, the transmitting unit 35 transmits detection information to the server 10. A wireless communication protocol such as Bluetooth low energy (BLE, registered trademark), wireless fidelity (Wi-Fi) Direct (registered trademark) may be used for wireless coupling.

The receiving unit 36 couples to the server 10 wirelessly, another smartphone 30, peripheral equipment, or the like, and receives various kinds of data. For example, the receiving unit 36 receives a request to detect a beacon signal, the request designating a given beacon ID, from the server 10. The display unit 37 displays given information.

With such a configuration, in the server 10 according to the present embodiment, a central processing unit (CPU) 106 (see FIG. 27) performs detection processing using an information processing program and various kinds of data stored in the storage unit 11.

Figure 3:
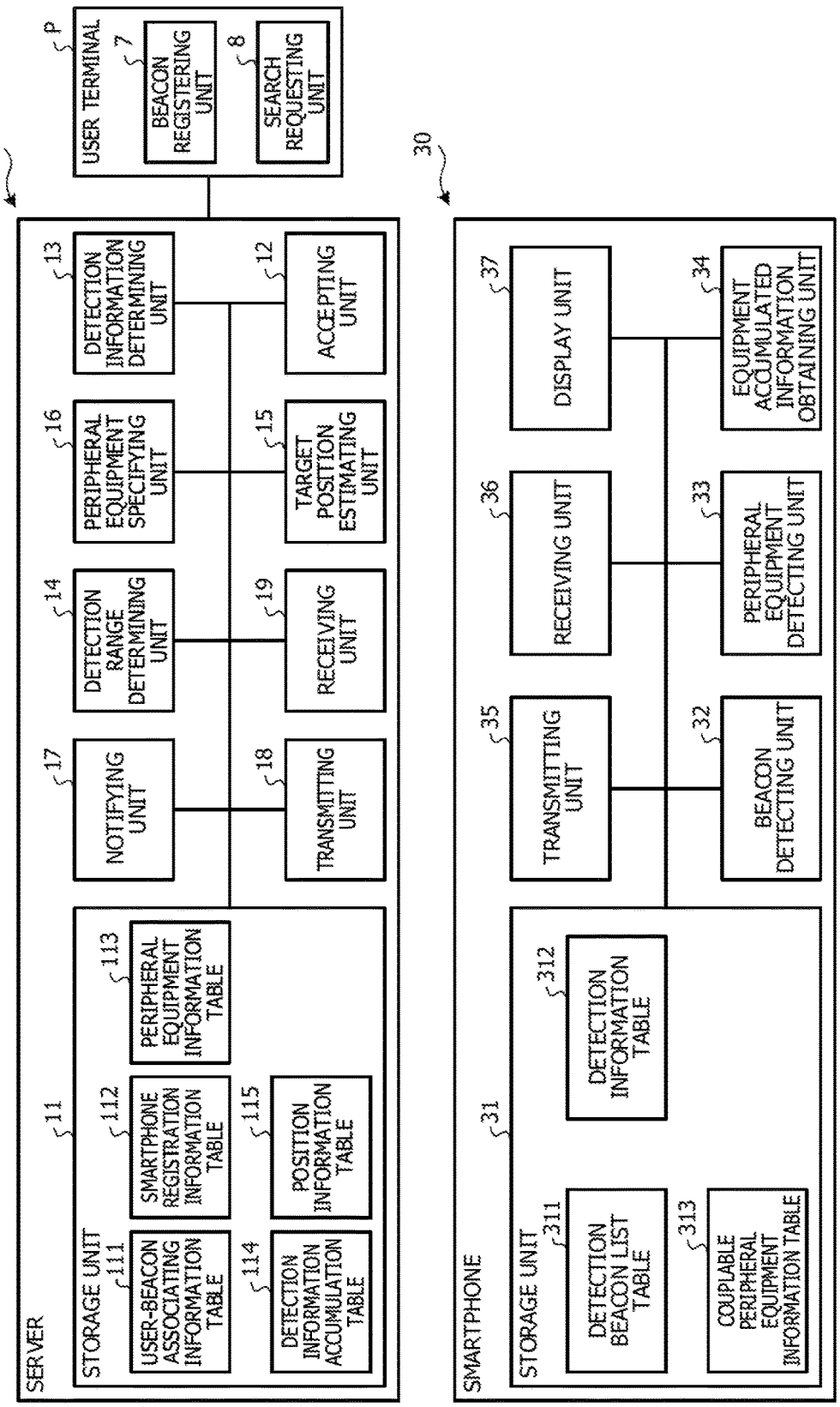
FIG. 3 is a diagram illustrating an example of functional configuration of each piece of equipment in a detecting system according to a first embodiment.

Incidentally, FIG. 3 depicts a block diagram in which attention is directed to functions. Each part illustrated in the functional blocks may be implemented by only hardware, only software, or a combination of hardware and software.

Figure 12:
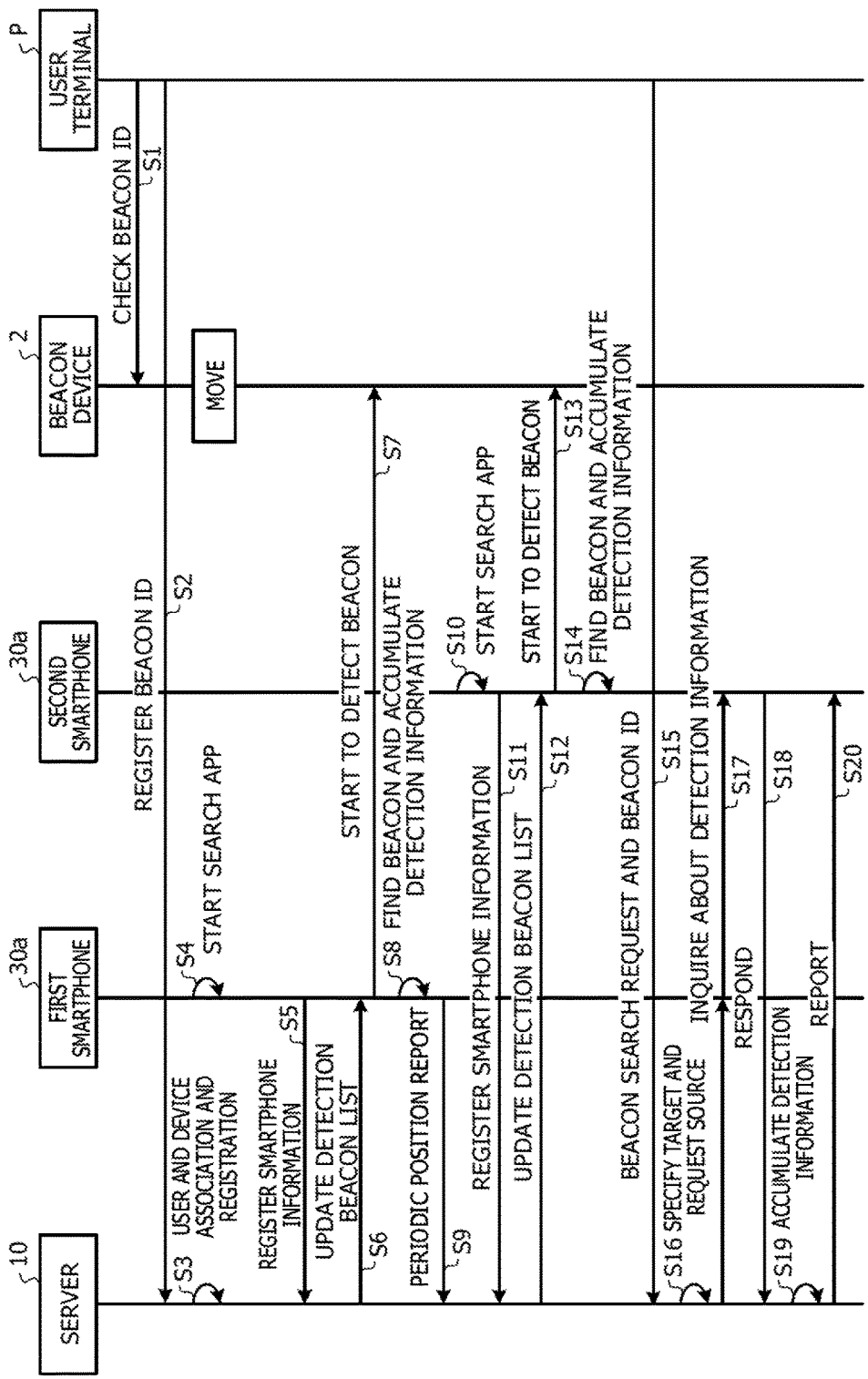
FIG. 12 is a sequence diagram illustrating an example of detection processing according to the first embodiment.
Figure 13:
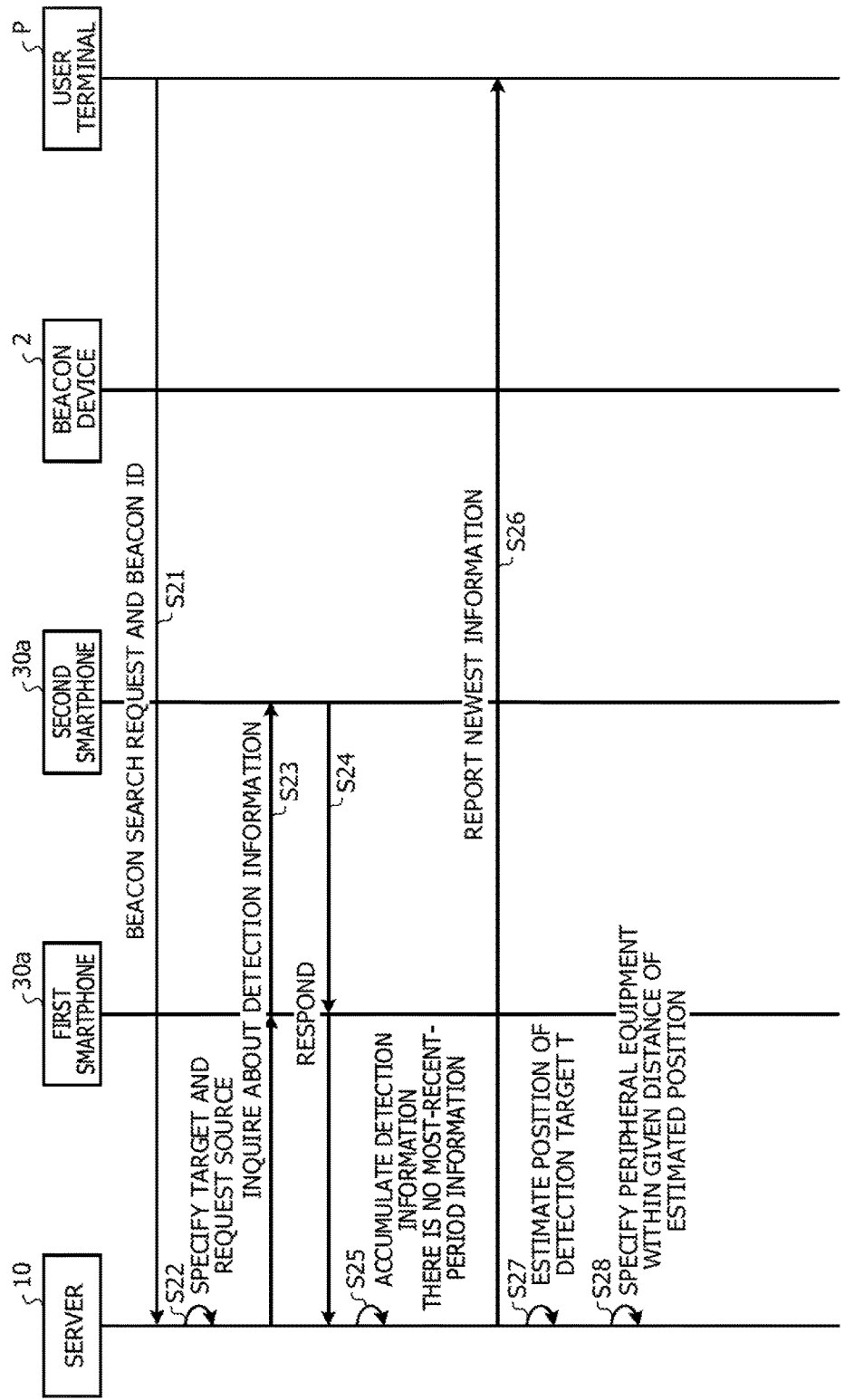
FIG. 13 is a sequence diagram illustrating an example of detection processing according to the first embodiment (continuation)
Figure 14:
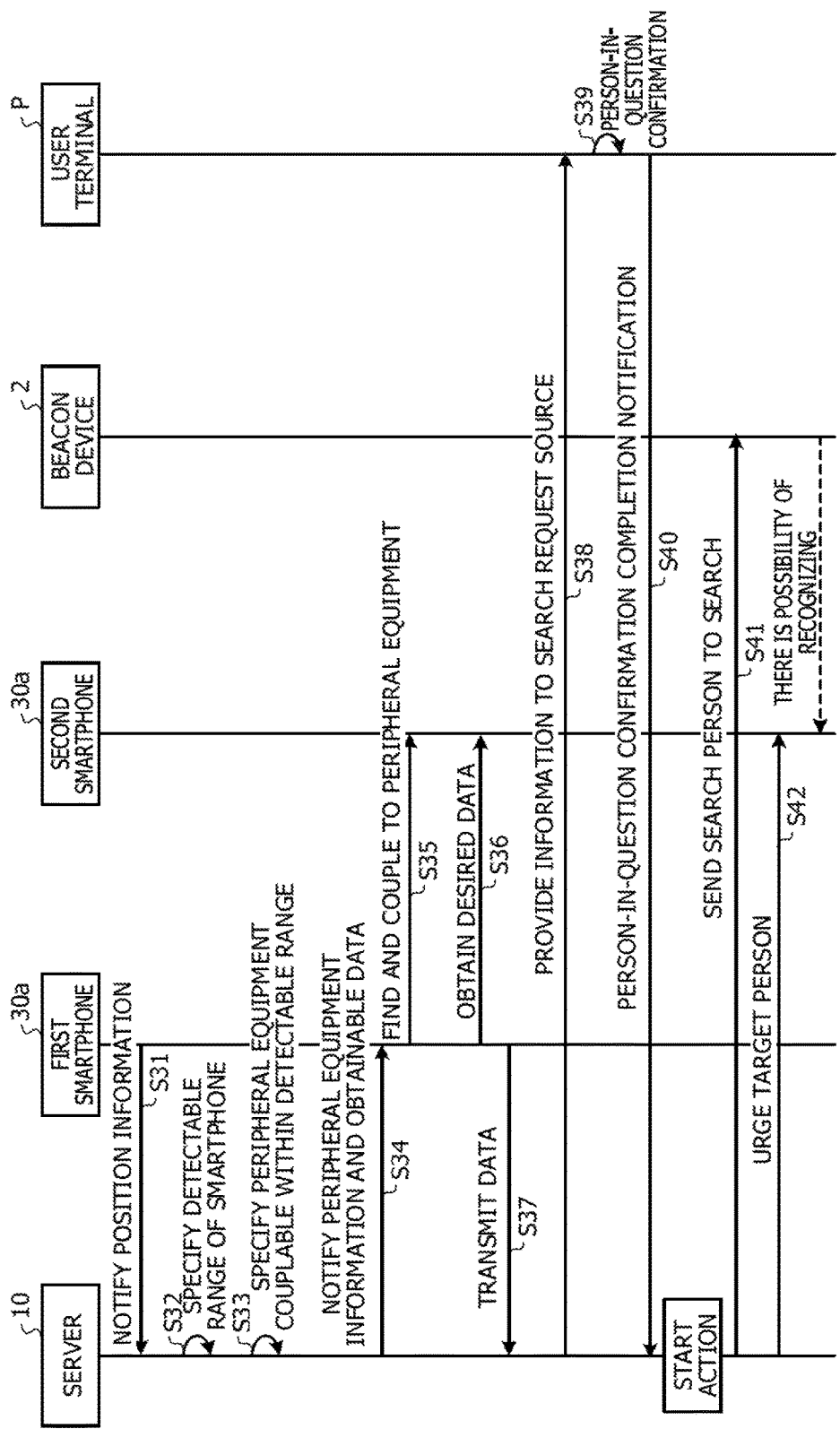
FIG. 14 is a sequence diagram illustrating an example of detection processing according to the first embodiment (continuation)

Detection processing according to the present embodiment will next be described with reference to FIGS. 12 to 14. FIG. 12 is a sequence diagram illustrating an example of the detection processing according to the first embodiment. FIG. 13 is a sequence diagram illustrating an example of the detection processing according to the first embodiment (continuation of FIG. 12). FIG. 14 is a sequence diagram illustrating an example of the detection processing according to the first embodiment (continuation of FIG. 13).

Operation of the server 10, operation of a first smartphone 30a, operation of a second smartphone 30b, operation of the beacon device 2 (carried by the detection target T), and operation of the user terminal P are illustrated in order from the left of the sheet of FIG. 12. Incidentally, the operation of the server 10 is performed by the respective functional units of the server 10 described above. In addition, the operation of the first smartphone 30a and the second smartphone 30b is performed by the respective functional units of the smartphone 30 described above. In addition, the operation of the user terminal P is performed by the respective functional units of the user terminal P described above. In addition, in the following, for the convenience of description, the operations of the first smartphone 30a and the second smartphone 30b will be described as an example of operation of the smartphone 30 registered in the smartphone registration information table 112 in advance, and description of operation of other smartphones 30 will be omitted. Actually, however, the other smartphones 30 than the first smartphone 30a and the second smartphone 30b, the other smartphones 30 being registered in advance and having the search application installed thereon, are in a state of being able to operate similarly, and notify detection information about the beacon device 2 to the server 10 as appropriate.

Figure 15:
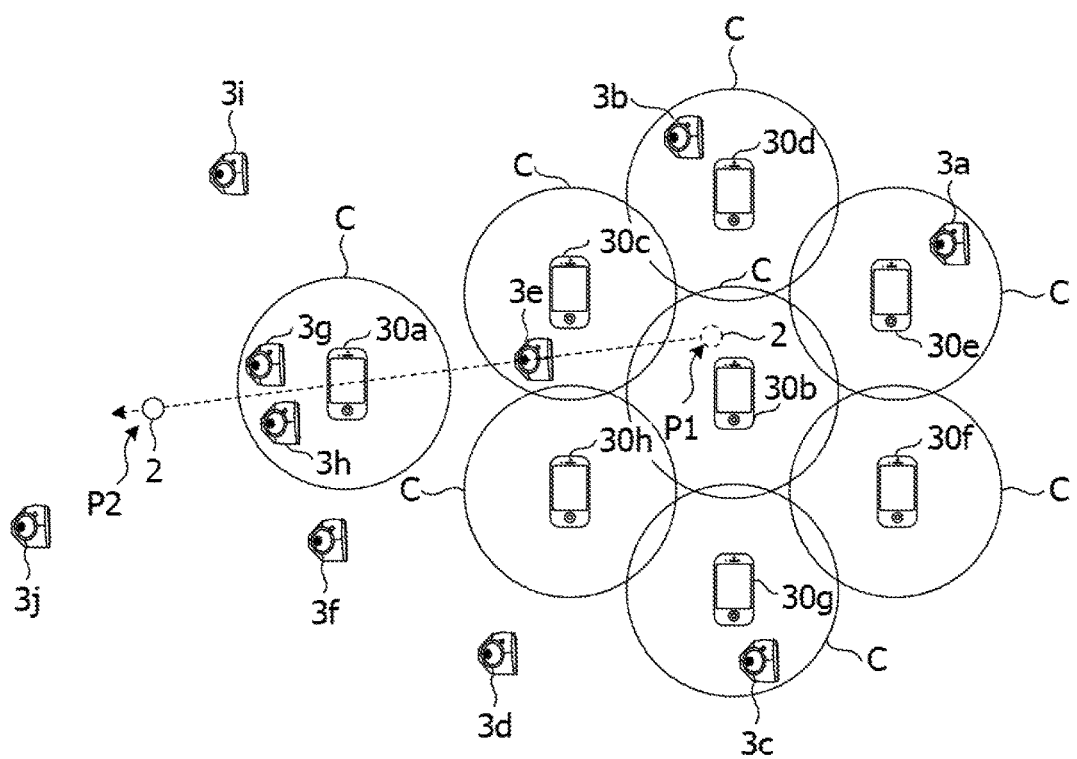
FIG. 15 is a diagram of assistance in explaining detection processing according to the first embodiment.

For example, in the example illustrated in FIG. 15, smartphones 30c to 30h other than the first smartphone 30a and the second smartphone 30b also start the search application as appropriate, and start to detect the beacon device 2. In addition, in the example of FIG. 15, the detection target T to which the beacon device 2 is attached is moving to the left side of the sheet. The smartphones 30a to 30h also move similarly or stop moving. Incidentally, pieces of peripheral equipment 3a to 3j according to the present embodiment (which peripheral equipment will hereinafter be collectively referred to also as "peripheral equipment 3") are installed at fixed positions. The present embodiment supposes that the peripheral equipment 3 is a fixed camera. However, peripheral equipment usable in the present embodiment is not limited to a fixed camera.

In FIG. 12, first, at a time of beacon registration, the user terminal P checks the beacon ID of the beacon device 2 carried by the detection target T (step S1), and registers the beacon ID with the server 10 (step S2). When the server 10 obtains the beacon ID, the server 10 stores the user ID and the beacon ID in the user-beacon associating information table 111 (see FIG. 4) in association with each other (step S3). Incidentally, it is desirable that the registration processing of steps S1 to S3 is performed in advance, and performed at least before processing from step S21 on down is performed.

When the first smartphone 30a starts the search application (step S4), smartphone information (smartphone ID or the like) of the first smartphone 30a is registered with the server 10 (step S5). The server 10 updates the detection beacon list table 311 of the first smartphone 30a (step S6).

Next, the first smartphone 30a starts to detect the beacon device 2 specified by the beacon ID (step S7). The first smartphone 30a searches for the beacon signal of the beacon device 2 in the detection beacon list table 311, and accumulates detection information at points in time of finding the beacon signal in the detection information table 312 (step S8). The first smartphone 30a periodically reports the detection information table 312 to the server 10 (step S9). The server 10 accumulates the detection information obtained from the first smartphone 30a in the detection information accumulation table 114.

Next, the second smartphone 30b starts the search application (step S10), and registers smartphone information of the second smartphone 30b with the server 10 (step S11).

The server 10 updates the detection beacon list table 311 of the second smartphone 30b (step S12).

Next, the second smartphone 30b starts to detect the beacon device 2 specified by the beacon ID (step S13). The second smartphone 30b searches for the beacon signal of the particular beacon device 2, and accumulates detection information at points in time of finding the beacon signal in the detection information table 312 (step S14).

At this point in time, when the user terminal P specifies the beacon ID and transmits a request to search for the beacon device 2 (step S15), the server 10 accepts this request, and specifies the target and the source of the request (step S16). The server 10 specifies the beacon device 2 (detection target T) specified by the beacon ID and the user terminal P that has transmitted the search request. Next, the server 10 inquires of the first smartphone 30a and the second smartphone 30b about detection information (step S17).

For example, when the beacon device 2 is located at a position P1 in FIG. 15, the second smartphone 30b present in a range in which the beacon signal sent from the beacon device 2 may be received responds (step S18). The server 10 accumulates the detection information transmitted from the second smartphone 30b at the time of this response in the detection information accumulation table 114 (step S19), and reports to the second smartphone 30b that the detection information is obtained and accumulated (step S20). The above description has been made of a case of normal detection processing.

In contrast to this, a case where the detection information transmitted from the second smartphone 30b does not include most-recent-period detection information will be described with reference to FIG. 13.

In FIG. 13, when the user terminal P specifies the beacon ID and transmits a request to search for the beacon device 2 (step S21), the server 10 accepts this request, and specifies the target and the source of the request (step S22). Next, the server 10 inquires of the first smartphone 30a and the second smartphone 30b about detection information (step S23).

When there is a response from the second smartphone 30b (step S24), the server 10 accumulates the detection information transmitted from the second smartphone 30b in the detection information accumulation table 114 (step S25). Suppose that at this time, the detection information received from the second smartphone 30b does not include most-recent-period information (detection information within a given time of a present point in time).

Next, the server 10 reports newest information in the detection information to the user terminal P (step S26). At this time, the server 10 reports that the reported newest information does not include most-recent-period information. The server 10 estimates the position of the detection target T based on the detection information accumulated in the detection information accumulation table 114 (step S27). The server 10 stores the estimated position information of the detection target T in the position information table 115. In addition, the server 10 specifies peripheral equipment 3 within a given distance of the estimated position of the detection target T based on the peripheral equipment information table 113 (step S28). For example, the server 10 refers to the peripheral equipment information table 113, and identifies peripheral equipment 3 located at a position where it is difficult for the plurality of smartphones 30 to detect the beacon signal.

Subsequent FIG. 14 illustrates, in order from the left of the sheet of FIG. 14, operation of the server 10, operation of the first smartphone 30a, operation of the peripheral equipment 3, operation of the beacon device 2 (carried by the detection target T), and operation of the user terminal P.

When the server 10 accepts a notification of position information of the first smartphone 30a from the first smartphone 30a (step S31), the server 10 specifies a detectable range C of the first smartphone 30a (step S32). An example of the detectable range C of the first smartphone 30a is a circle having a radius of a maximum communication distance (Class 1: 100 M, Class 2: 10 M, and Class 3: 1 M) of BLE. Next, the server 10 specifies peripheral equipment 3 couplable within the detectable range C of the first smartphone 30a (step S33). The server 10 notifies the peripheral equipment information and obtainable data of the specified couplable peripheral equipment (step S34).

For example, when the beacon device 2 is present at a position P2 in the example of FIG. 15, the server 10 refers to the peripheral equipment information table 113 of FIG. 6, and specifies, as the peripheral equipment, fixed cameras 3d and 3f to 3j in a range in which it is difficult for the smartphones 30a to 30h to obtain the beacon signal. While the fixed cameras 3d and 3f to 3j may be specified as the peripheral equipment, the present embodiment specifies, as the peripheral equipment, the fixed camera 3g and the fixed camera 3h located in the vicinity of the beacon device 2 (or within a given range of the estimated position of the beacon device 2) among the fixed cameras 3d and 3f to 3j. The server 10 notifies peripheral equipment information (including coupling information and obtainable data information) of the fixed camera 3g and the fixed camera 3h to the first smartphone 30a.

The first smartphone 30a stores couplable peripheral equipment information and position information of the peripheral equipment in the couplable peripheral equipment information table 313. Accepting the notification, the first smartphone 30a searches for the peripheral equipment. When the first smartphone 30a may find the peripheral equipment, the first smartphone 30a couples to the peripheral equipment (step S35), and obtains desired data (step S36). In FIG. 15, the first smartphone 30a couples to the fixed camera 3g and the fixed camera 3h, and obtains video data from each of the fixed camera 3g and the fixed camera 3h. Next, the first smartphone 30a transmits the obtained data to the server 10 (step S37).

The server 10 transmits the obtained data to the user terminal P as the source equipment of search request (step S38). Thus, the information may be provided to the user as the source of search request. In the example of FIG. 15, the fixed camera 3g and the fixed camera 3h image video information of a region in which the beacon device 2 is present, and there is a possibility that the detection target T carrying the beacon device 2 may appear in the video.

Thus, in the present embodiment, in a case where the smartphone 30 is located outside the range C in which the beacon signal may be received, when peripheral equipment (fixed camera or the like) within a given range of the estimated position of the beacon device 2 and the smartphone 30 come into proximity to each other, video data obtained by the peripheral equipment is obtained via the smartphone 30. The smartphone 30 transmits the utilizable information other than obtained detection information to the server 10. Therefore, the accuracy of search for the detection target T carrying the beacon device 2 may be improved. For example, the detecting system 1 according to the present embodiment may track the detection target T based on information obtained from the smartphone 30 and information obtained from equipment other than the smartphone 30 by making the smartphone 30 and the peripheral equipment present in the vicinity of the smartphone 30 cooperate with each other. The accuracy of search for the detection target T may consequently be improved. Incidentally, the data provided to the user terminal P is not limited to video data, but may be audio data or other data.

When the user confirms from the provided data that the detection target T (person in question) is present in the vicinity of the estimated position, and performs an operation indicating person-in-question confirmation completion, the user terminal P recognizes the person-in-question confirmation (step S39), and provides a person-in-question confirmation completion notification to the server 10 (step S40).

The server 10 starts an action in response to this notification. For example, the server 10 performs control so as to send an operator to search for the detection target T carrying the beacon device 2 (step S41), and performs control so as to urge the target person (step S42).

Figure 16:
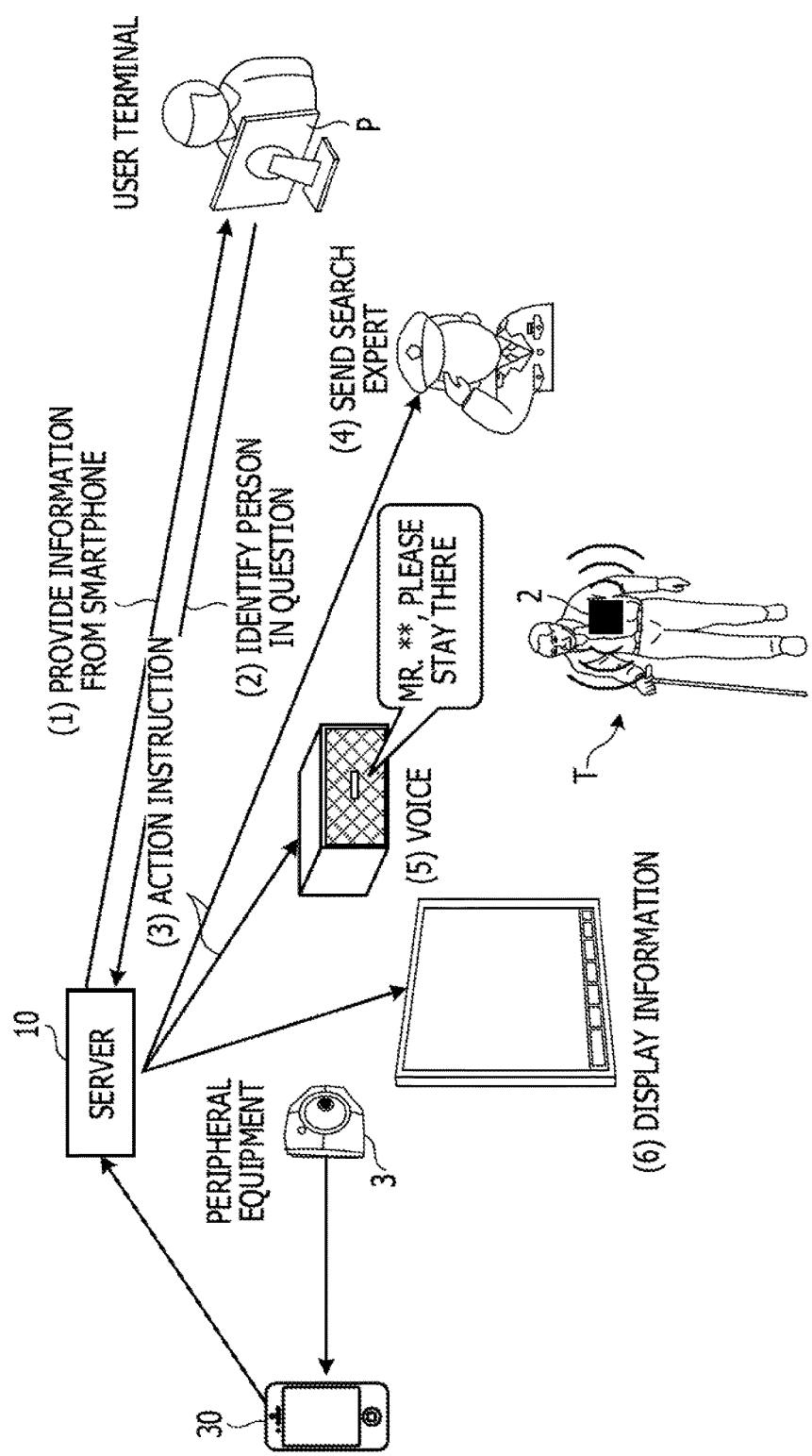
FIG. 16 is a diagram illustrating an example of usage of a result of detection processing according to the first embodiment.

An example of the action will be described with reference to FIG. 16.

(1) The video information obtained by the server 10 via the smartphone 30 is provided to the user operating the user terminal P.

(2) When the user confirms that the detection target T appears in the video information, the user terminal P notifies the server 10 that the detection target T appearing in the video information is identified as the person in question.

(3) The server 10 gives an instruction for the action. The supported action includes the following examples of (4) to (6).

(4) Sending an expert for searching for the detection target T (5) Appealing to the detection target T by voice from a speaker installed in the vicinity of the estimated position of the detection target T (for example, outputting a voice "Mr. **, please stay there")

(6) Appealing to the detection target T by display of information from digital signage installed in the vicinity of the estimated position of the detection target T (for example, displaying a screen "Mr. **, please stay there")

There is thus a possibility that the person as the detection target T may recognize these appeals, and be taken into protective custody.

As described above, in the detecting system 1 according to the first embodiment, the server 10 specifies appropriate peripheral equipment 3 from the position information (detection information) of the smartphone 30 and the history information of the estimated position of the beacon device 2 (detection target T). The server 10 distributes peripheral equipment information desirable for coupling to the specified peripheral equipment 3 and obtainable data to the smartphone 30. Thus, the smartphone 30 may couple to the desired peripheral equipment 3 in desired timing, and receive data detected by the peripheral equipment 3. The accuracy of search for the detection target T may therefore be improved by utilizing, for searching for the detection target T, not only the detection information detected by the smartphone 30 but also the data detected by the fixed device (surveillance camera or the like) not coupled to the network 5.

Second Embodiment

A detecting system 1 according to a second embodiment will next be described. The detecting system 1 according to the second embodiment utilizes not only peripheral equipment but also a smartphone 30 that has not received a search request from the user terminal P. In the second embodiment, information about a smartphone 30 that has not received a search request from a server 10 (which smartphone will hereinafter be referred to also as an "unreached smartphone") is notified to a smartphone 30 that has received the search request from a user terminal P, and detection information is exchanged when the smartphone 30 comes into proximity to the unreached smartphone. The detection information detected by the unreached smartphone is thereby rendered usable for searching for a detection target T.

Figure 17B:
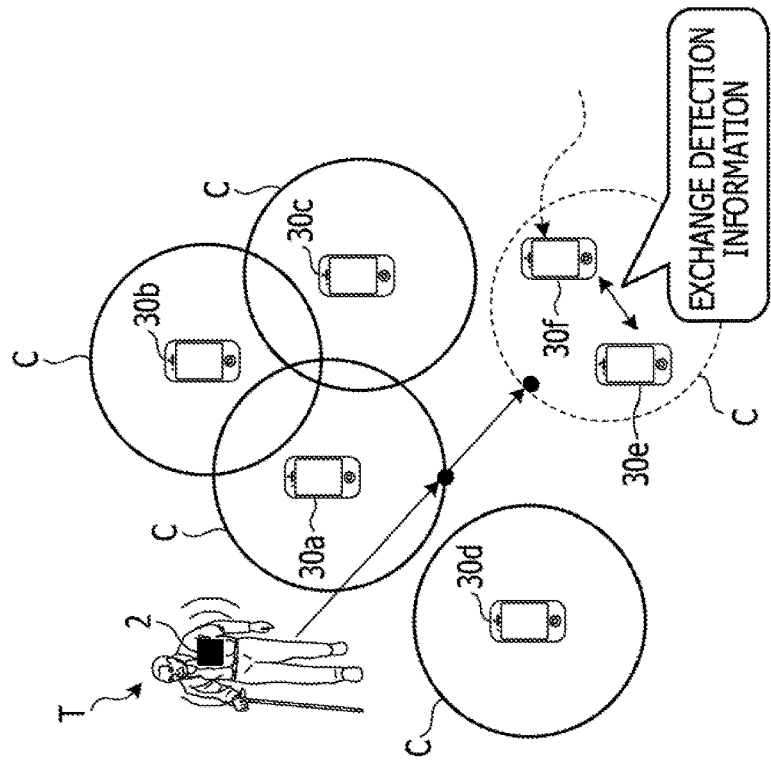
FIGS. 17A and 17B are diagrams of assistance in explaining detection processing according to a second embodiment.
Figure 17A:
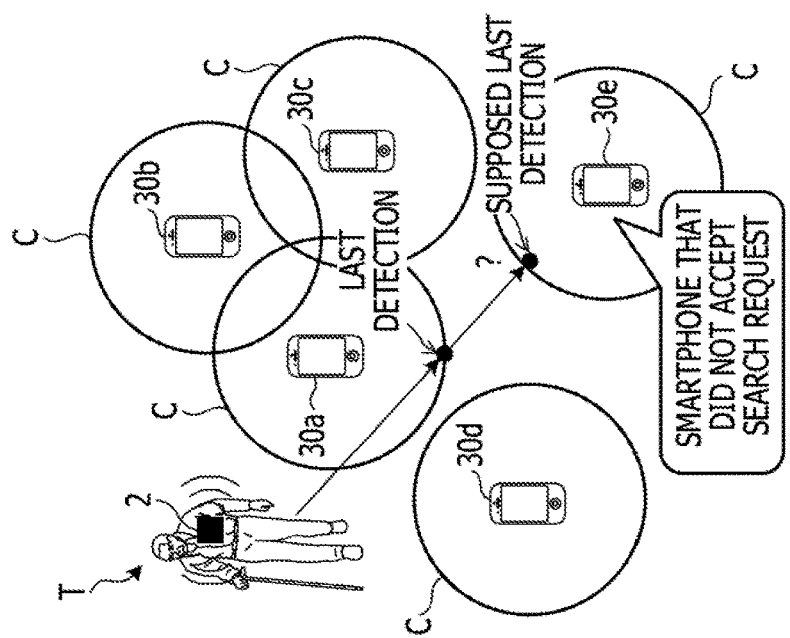

As illustrated in FIG. 17A, when there is a smartphone 30 that has not received the search request (unreached smartphone 30e), information about the search request or detection information is exchanged when a smartphone 30f that has received the search request comes into proximity to the unreached smartphone 30e, as illustrated in FIG. 17B. The detection information detected by the unreached smartphone 30e is thereby rendered usable for searching for the detection target T.

Figure 18:
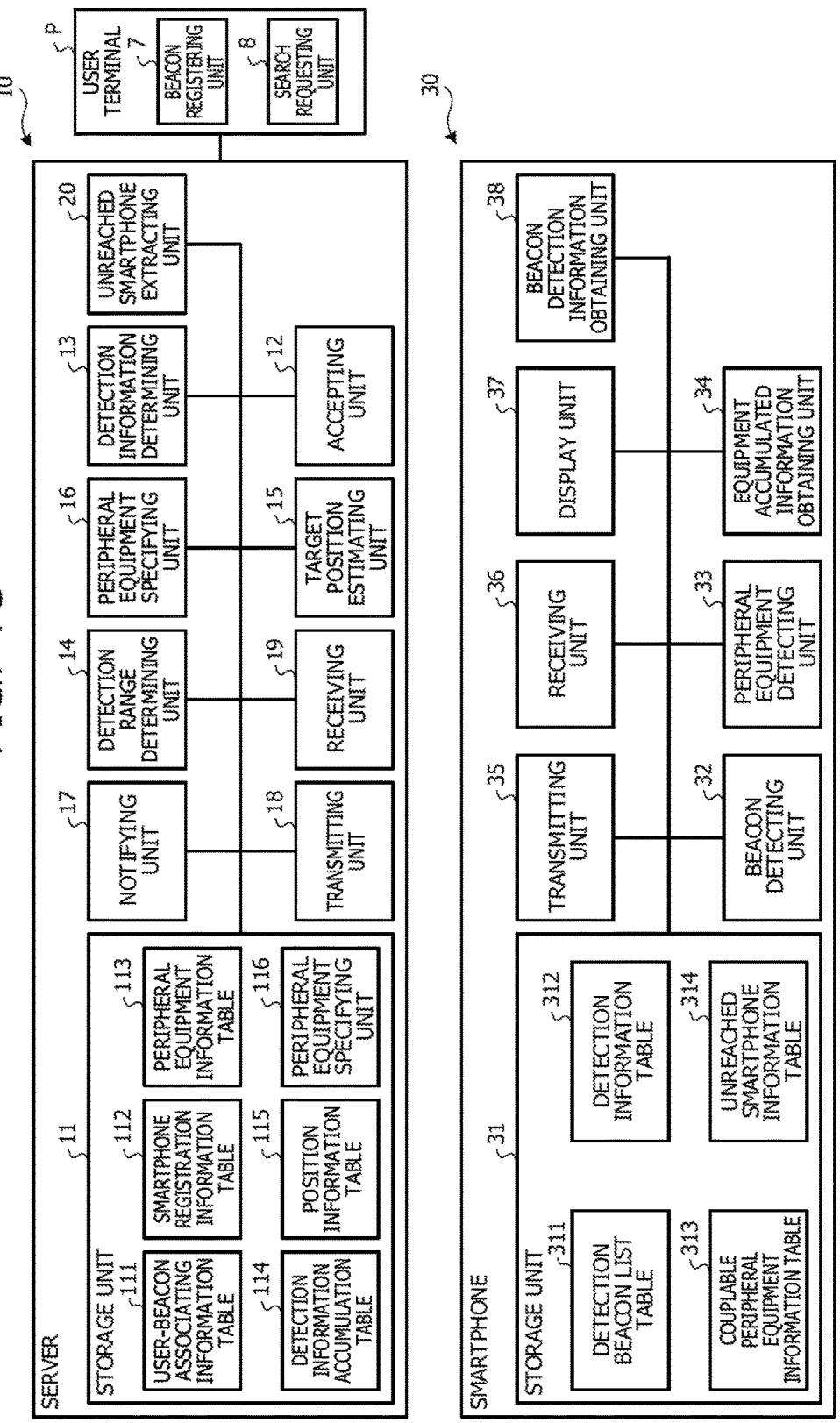
FIG. 18 is a diagram illustrating an example of functional configuration of each piece of equipment in a detecting system according to the second embodiment.

An example of functional configuration of each piece of equipment including a server 10, a smartphone 30, and a user terminal P in the detecting system 1 according to the second embodiment will be described with reference to FIG. 18. However, description will be made only of functions different from the functions of the server 10, the smartphone 30, and the user terminal P according to the first embodiment, and description of the same functions will be omitted.

For example, functions of the user terminal P according to the second embodiment are the same as the functions of the user terminal P according to the first embodiment. Functions of the server 10 according to the second embodiment are different in that a search request history information table 116 in a storage unit 11 and an unreached smartphone extracting unit 20 are added in addition to the functions of the server 10 according to the first embodiment. Functions of the smartphone 30 according to the second embodiment are different in that an unreached smartphone information table 314 in a storage unit 31 and a beacon detection information obtaining unit 38 are added in addition to the functions of the smartphone 30 according to the first embodiment.

Figure 19:
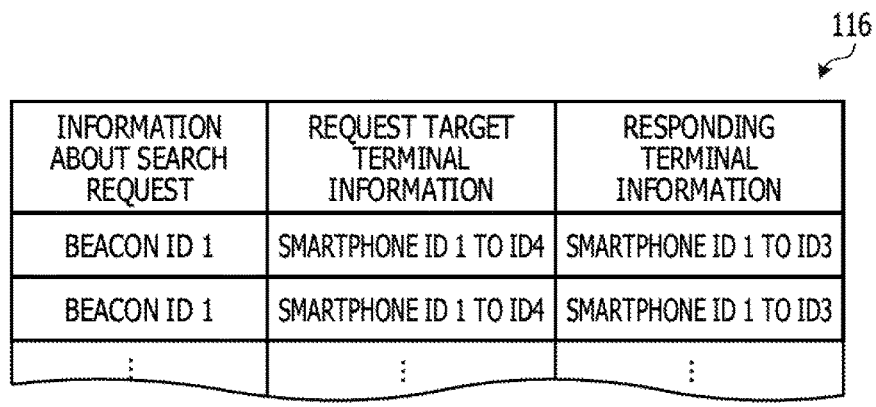
FIG. 19 is a diagram illustrating an example of a search request history information table according to one embodiment.

The search request history information table 116 retains contents of search requests and transmission results. FIG. 19 illustrates an example of the search request history information table 116 according to one embodiment. The search request history information table 116 includes information about a search request, request target terminal information, and responding terminal information. The information about the search request is information for specifying the search request made by the user terminal P, and may be, for example, the beacon ID of the search request target. The request target terminal information is information about smartphones 30 targeted as destinations of search request. The responding terminal information is information about smartphones 30 that have successfully received the search request among the smartphones 30 targeted as the destinations of search request.

The unreached smartphone extracting unit 20 extracts a smartphone that has not received the search request (unreached smartphone). Incidentally, when the unreached smartphone is extracted, terminal information of the unreached smartphone is notified to the smartphones 30 that have received the search request. In the example of FIG. 19, the unreached smartphone extracting unit 20 extracts a smartphone having a smartphone ID4 as the smartphone that has not received the search request.

Figure 20:
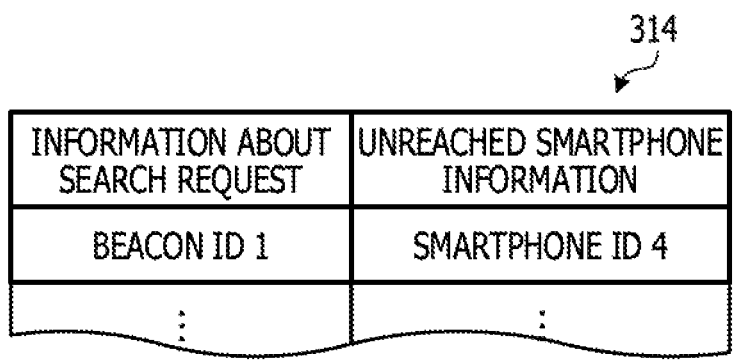
FIG. 20 is a diagram illustrating an example of an unreached smartphone information table according to one embodiment.

The unreached smartphone information table 314 retains the terminal information of the search request unreached smartphone, the terminal information being notified from the server 10. FIG. 20 illustrates an example of the unreached smartphone information table 314 according to one embodiment. The unreached smartphone information table 314 stores information about the search request and unreached smartphone information. The information about the search request is information for specifying the search request made by the user terminal P, and may be, for example, the beacon ID of the search request target. The unreached smartphone information stores the smartphone ID of the smartphone that has not received the search request.

The beacon detection information obtaining unit 38 obtains information about the search request (beacon ID) from another smartphone 30.

Figure 21:
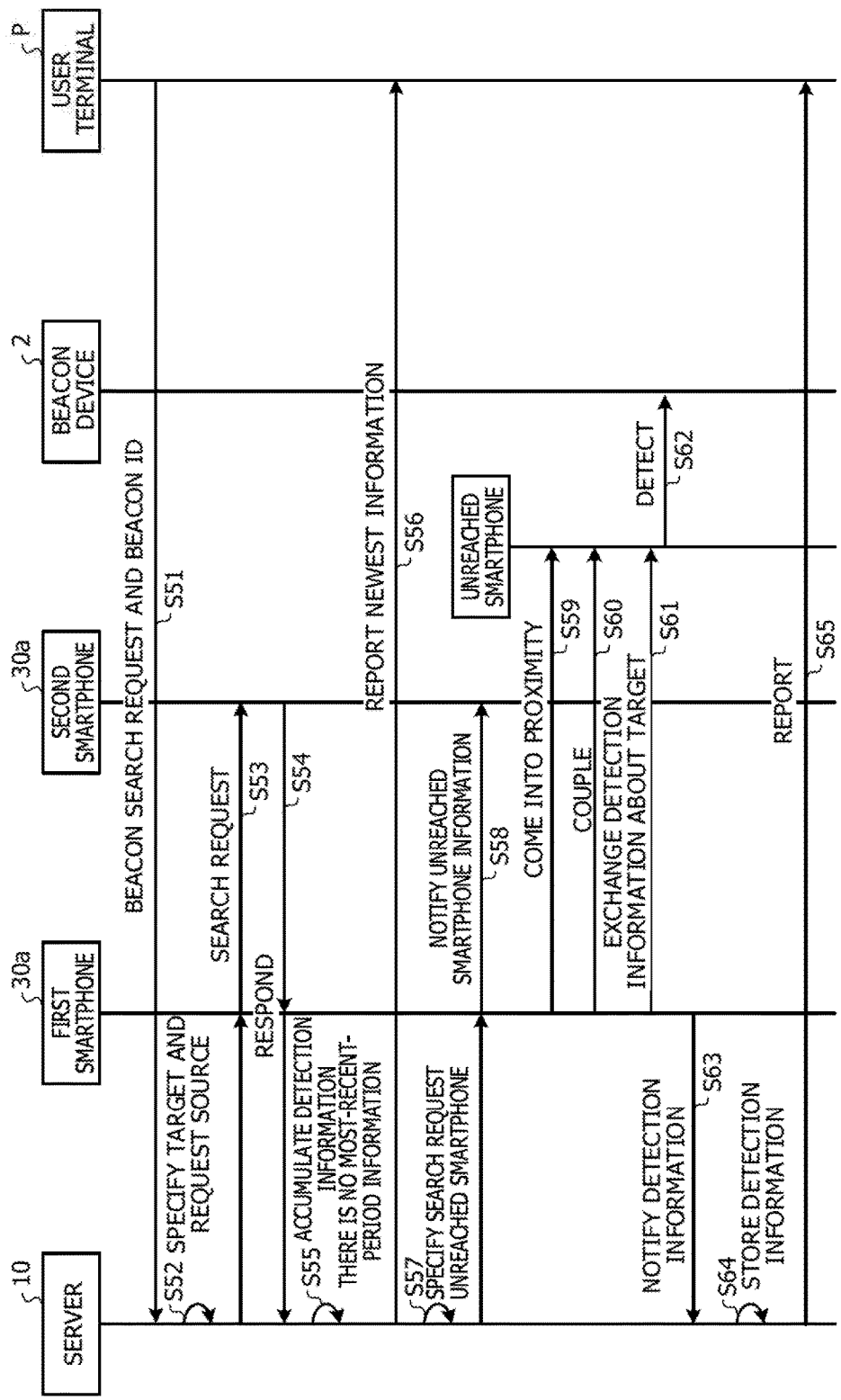
FIG. 21 is a sequence diagram illustrating an example of detection processing according to the second embodiment.

Detection processing according to the present embodiment will next be described with reference to FIG. 21. FIG. 21 is a sequence diagram illustrating an example of detection processing according to the second embodiment. Operation of the server 10, operation of a first smartphone 30*a*, operation of a second smartphone 30*b*, operation of a beacon device 2 (carried by the detection target T), and operation of the user terminal P are illustrated in order from the left of the sheet of FIG. 21.

The present processing is started, and as in the first embodiment, steps S2 to S20 in FIG. 12 are performed. Processing of steps S51 to S56 substantially identical to the processing illustrated in steps S21 to S26 in FIG. 13 is thereafter performed.

Next, the server 10 refers to the unreached smartphone information table 314, and specifies an unreached smartphone that has not received the search request (step S57). The server 10 notifies the ID (unreached smartphone information) of the unreached smartphone to the smartphones 30 that have received the search request (step S58).

Accepting the notification, the smartphones 30 that have received the search request (the first smartphone 30*a* and the second smartphone 30*b* in the example of FIG. 21) store the beacon ID as information about the target search request and the smartphone ID as unreached smartphone information in association with each other in the unreached smartphone information table 314.

When the first smartphone 30*a* comes into proximity to the unreached smartphone, and becomes able to communicate with the unreached smartphone (step S59), the first smartphone 30*a* couples to the unreached smartphone (step S60). The first smartphone 30*a* transfers the information about the search request to the unreached smartphone (step S61). When the unreached smartphone detects the beacon signal of the beacon device 2 based on the information about the search request (step S62), the unreached smartphone transmits detection information of the unreached smartphone at that point in time to the first smartphone 30*a*. The first smartphone 30*a* may thereby notify the detection information exchanged with the unreached smartphone to the server 10 (step S63). The server 10 accumulates the detection information in the detection information accumulation table 114 (step S64). The server 10 transmits the accumulated detection information to the user terminal P (step S65).

As described above, according to the detecting system 1 in accordance with the second embodiment, in addition to the effects of the detecting system 1 according to the first embodiment, because the smartphone 30 that has received the search request exchanges the detection information when in proximity to the unreached smartphone, the detection information detected by the unreached smartphone may be used for searching for the detection target T. Incidentally, the above-described detection processing may be performed in combination with the detection processing according to the first embodiment.

Third Embodiment

Figure 22B:
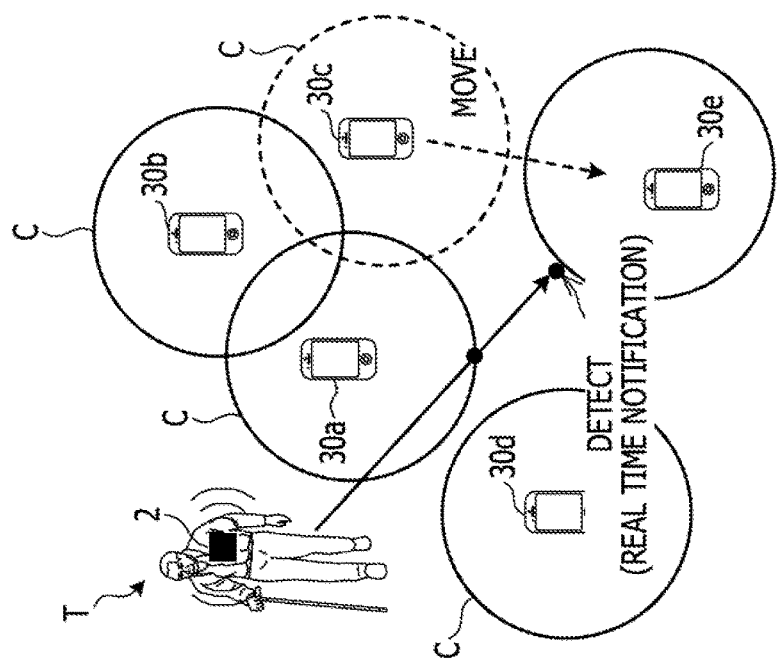
FIGS. 22A and 22B are diagrams of assistance in explaining detection processing according to a third embodiment.
Figure 22A:
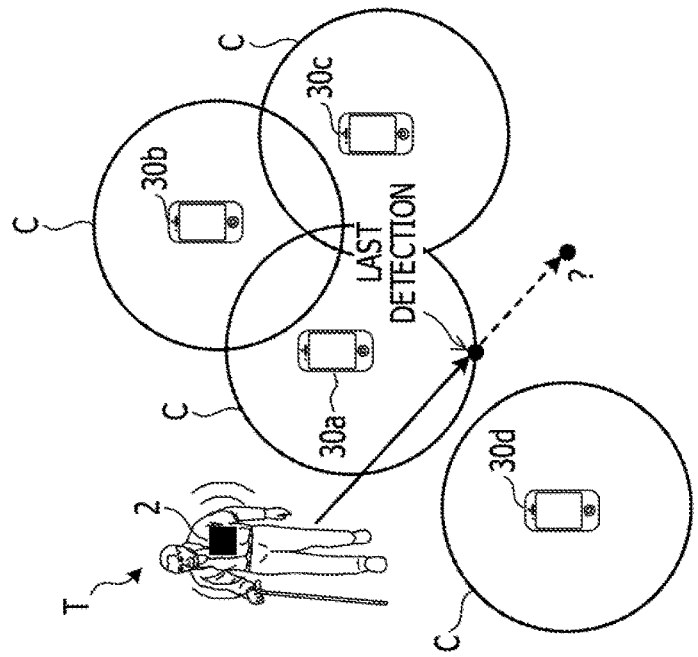

A detecting system 1 according to a third embodiment will next be described. In the detecting system 1 according to the third embodiment, when no detection information has been received for a given time, detection information is notified to a server 10 in real time. In order to realize this, in the third embodiment, when most-recent-period detection information (detection information within a given time of a present time) is not found, as illustrated in FIG. 22A, the server 10 transmits a search continuation notification to all smartphones 30. A change is thereby made to a search continuation mode in which detection information is notified to the server 10 in real time. For example, when a smartphone 30*e* illustrated in FIG. 22B obtains detection information in the mode of real time notification, the detection information is notified to the server 10 in real time.

Figure 23:
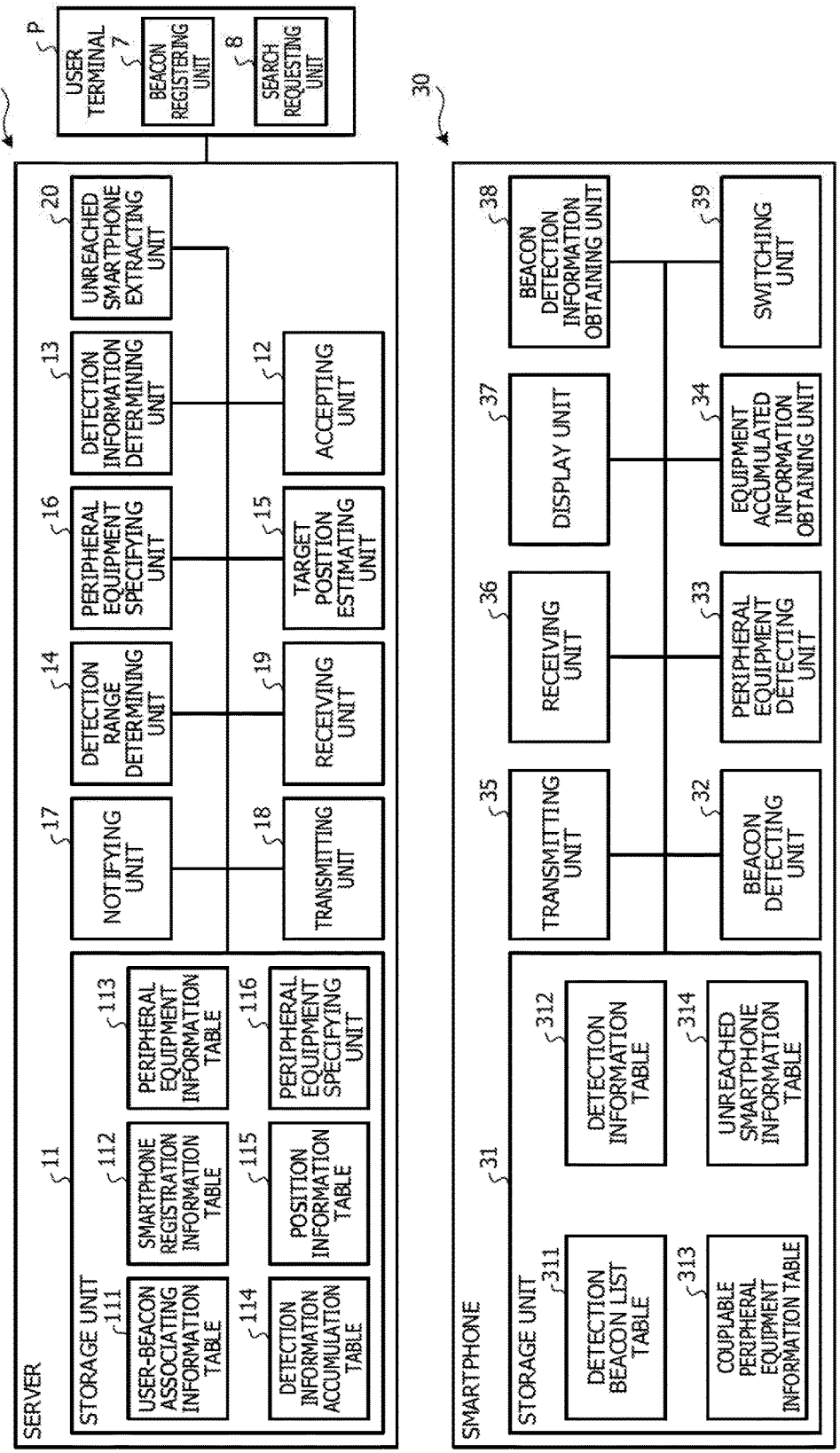
FIG. 23 is a diagram illustrating an example of functional configuration of each piece of equipment in a detecting system according to the third embodiment.

An example of functional configuration of each piece of equipment including a server 10, a smartphone 30, and a user terminal P in the detecting system 1 according to the third embodiment will be described with reference to FIG. 23. However, description will be made only of functions different from the respective functions of the servers 10, the smartphones 30, and the user terminals P according to the first and second embodiments, and description of the same functions will be omitted.

For example, functions of the user terminal P according to the third embodiment are the same as the functions of the user terminals P according to the first and second embodiments. Functions of the server 10 according to the third embodiment are the same as the functions of the servers 10 according to the first and second embodiments. Functions of the smartphone 30 according to the third embodiment are different in that a switching unit 39 is added in addition to the functions of the smartphones 30 according to the first and second embodiments.

The switching unit 39 switches, according to an instruction of the server 10, between a search continuation mode, in which a report is made to the server 10 immediately when a beacon signal is detected, and a normal mode, in which a search request is received and detection information is reported. The storage unit 11 retains mode information indicating whether a report state is the search continuation mode or the normal mode.

Incidentally, when no detection information has been received from a plurality of smartphones 30 for a given time, the notifying unit 17 transmits a search continuation notification to all of the smartphones 30. At a time of search completion, the search continuation mode is released, and switched to the normal mode.

Figure 24:
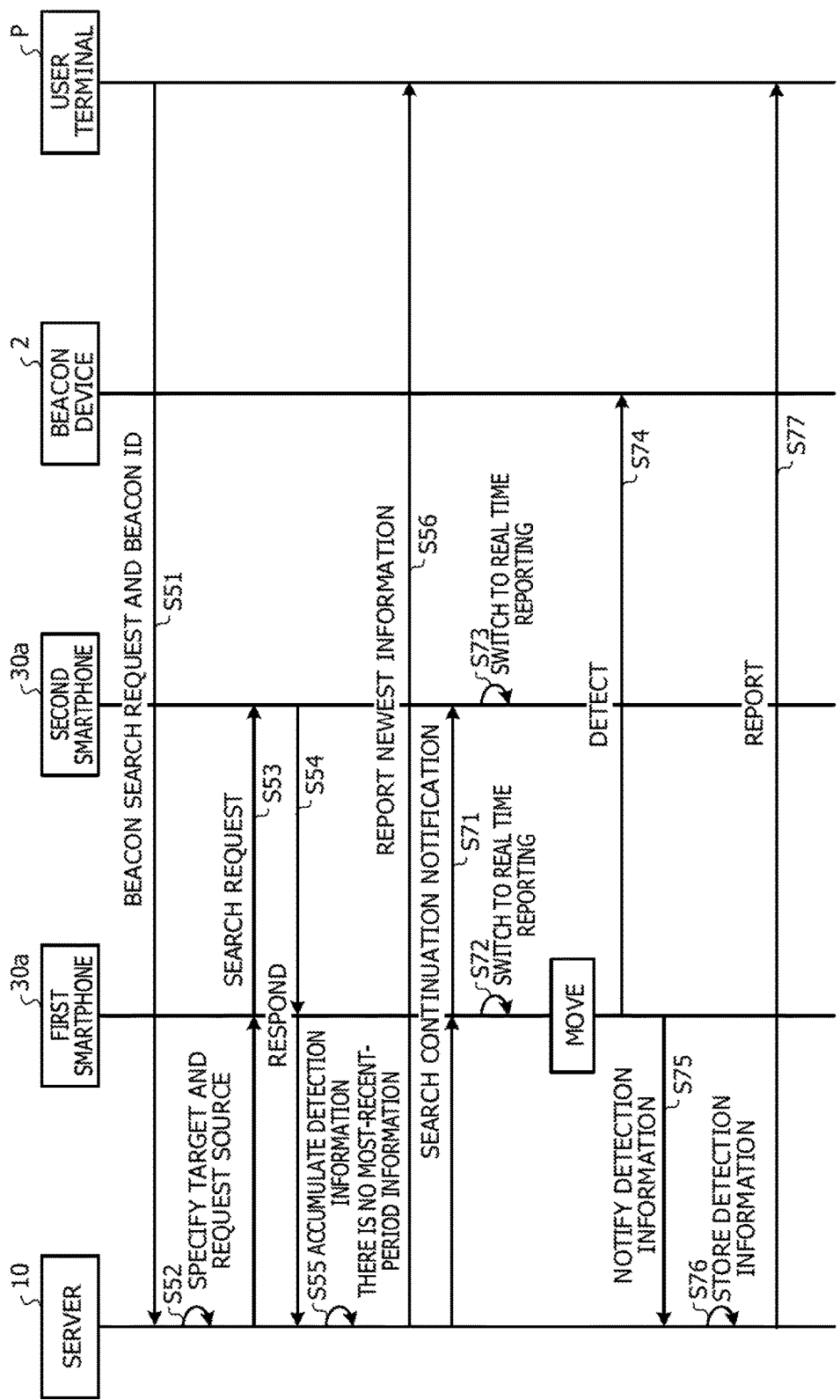
FIG. 24 is a sequence diagram illustrating an example of detection processing according to the third embodiment.

Detection processing according to the present embodiment will next be described with reference to FIG. 24. FIG. 24 is a sequence diagram illustrating an example of detection processing according to the third embodiment. Operation of the server 10, operation of the first smartphone 30*a*, operation of the second smartphone 30*b*, operation of a beacon device 2 (carried by a detection target T), and operation of the user terminal P are illustrated in order from the left of the sheet of FIG. 24.

The present processing is started, and as in the second embodiment, steps S2 to S20 in FIG. 12 are performed. Processing identical to the processing illustrated in steps S51 to S56 in FIG. 21 is thereafter performed.

Next, when no detection information has been received from the plurality of pieces of terminal equipment for a given time or more, the server 10 transmits a search continuation notification to the first smartphone 30a and the second smartphone 30b (step S71). This notification effects switching to the search continuation mode in which detection information obtained when the beacon signal is detected is immediately reported to the server 10. The storage unit 11 stores a flag indicating that mode information representing the report state is the search continuation mode.

Accepting the search continuation notification, the first smartphone 30a and the second smartphone 30b switch to the search continuation mode in which the first smartphone 30a and the second smartphone 30b report detection information immediately (in real time) upon obtaining the detection information (steps S72 and S73).

Next, when the first smartphone 30a obtains detection information (step S74) as a result of movement of the first smartphone 30a or the like, and the first smartphone 30a immediately notifies the detection information (step S75), the server 10 stores the detection information detected by the first smartphone 30a in the detection information accumulation table 114 (step S76), and transmits the detection information obtained in real time to the user terminal P (step S77). At the time of the search completion, the search continuation mode is released, and switched to the normal mode.

As described above, according to the detecting system 1 in accordance with the third embodiment, in addition to the effects of the detecting systems 1 according to the first and second embodiments, the server 10 notifies search continuation to the first smartphone 30a and the second smartphone 30b when the server 10 has not received detection information from any of the smartphones for a given time. Thereby, when one of the smartphones 30 obtains detection information, the server 10 may receive the detection information in real time. Because the smartphones 30 thus make real time notification temporarily, the detection target T may be found more quickly. Incidentally, the above-described detection processing may be performed in combination with at least one of the detection processing according to the first embodiment and the detection processing according to the second embodiment.

Fourth Embodiment

A detecting system 1 according to a fourth embodiment will next be described. Wireless signals for coupling between pieces of equipment include, for example, various kinds such as BLE Advertise signals and service set identifiers (SSIDs) of Wi-Fi/Wi-Fi Direct. In order for a smartphone 30 to couple to an unreached smartphone (smartphone that a search request has not reached) or peripheral equipment, it is desirable for the smartphone 30 to send a wireless signal by which these pieces of equipment may be coupled.

On the other hand, in a case where a smartphone not registered with the present detecting system 1, for example, a smartphone unrelated to the present detecting system 1 (which smartphone will hereinafter be referred to as an "unrelated smartphone") sends a wireless signal by which the unreached smartphone and the peripheral equipment may be coupled, the unrelated smartphone may find these pieces of equipment, and couple to these pieces of equipment.

In such a peer to peer (P2P) coupling, coupling target equipment may be limited to one piece of coupling target equipment. In this case, until the unrelated smartphone discouples from the unreached smartphone or the peripheral equipment after coupling to the unreached smartphone or the peripheral equipment, the smartphone 30 registered with the present detecting system 1 may not be able to couple to these pieces of equipment. For example, a case is assumed in which, when it is desirable for the smartphone 30 to couple to the unreached smartphone or the peripheral equipment to perform the detection processing according to the first to third embodiments, it is difficult for the smartphone 30 to couple to these pieces of equipment. Thus, a delay may occur in the processing, or the accuracy of search for the detection target T may be decreased.

Accordingly, the detecting system 1 according to the fourth embodiment has a function of excluding the unrelated smartphone from coupling to the unreached smartphone or the peripheral equipment. Incidentally, respective functional blocks of a server 10, a smartphone 30, and a user terminal P according to the fourth embodiment are the same as the respective functional blocks of the server 10, the smartphone 30, and the user terminal P according to the third embodiment illustrated in FIG. 23.

In the present embodiment, the peripheral equipment and the unreached smartphone each retain an access key to the own equipment, and share key information by registering the access key with the server 10 in advance. The peripheral equipment and the unreached smartphone are each in a state of entrusting a right to access the own equipment to the server 10. Access processing during detection processing according to the present embodiment will be described in the following.

Figure 25:
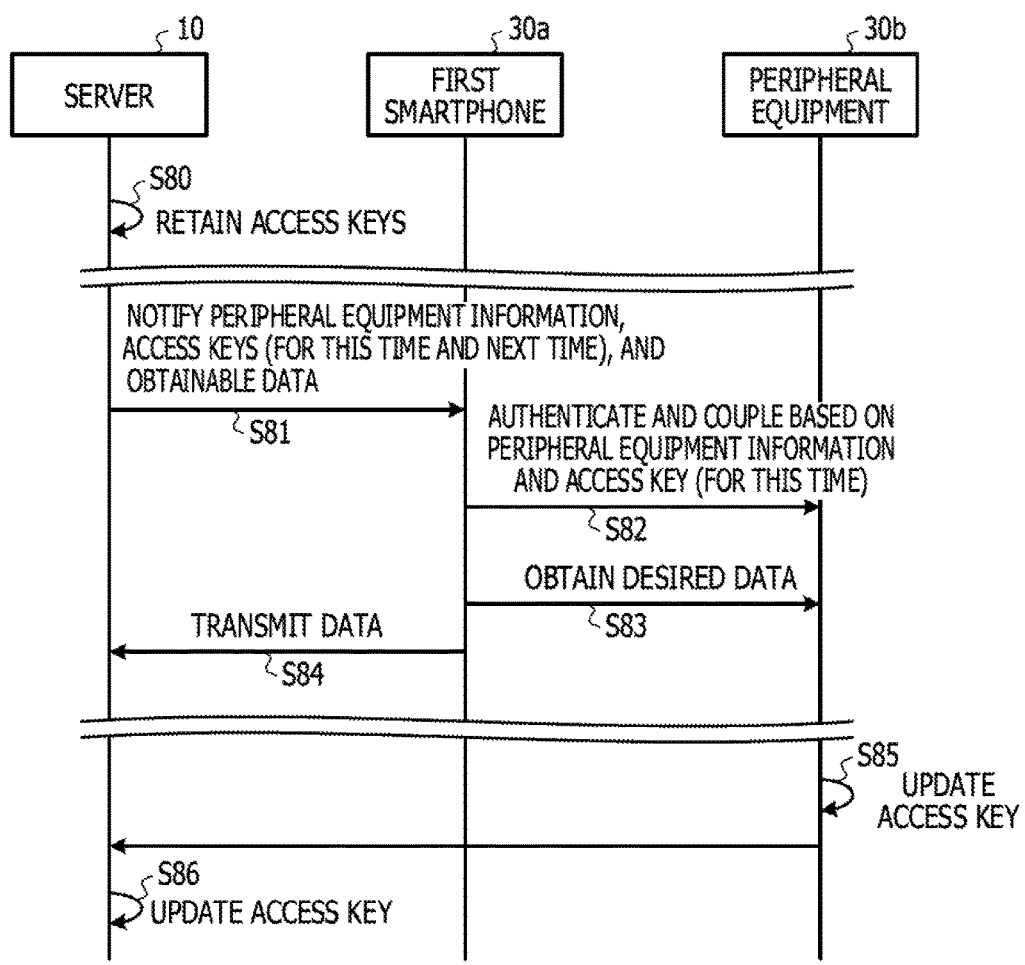
FIG. 25 is a sequence diagram illustrating an example of detection processing according to a fourth embodiment.

FIG. 25 is a sequence diagram illustrating an example of the detection processing according to the fourth embodiment. As illustrated in FIG. 25, the server 10 stores and retains an access key for this time and an access key for a next time in the storage unit 11 in advance (step S80).

The server 10 notifies peripheral equipment information, the access key for this time, the access key for the next time, and obtainable data to a first smartphone 30a in given timing (step S81). Based on the peripheral equipment information, and using the access key for this time, the first smartphone 30a authenticates and couples to peripheral equipment 3 (step S82). The peripheral equipment 3 has obtained the access key for this time in advance. Thus, because the unrelated smartphone does not have the access key, it is difficult for the unrelated smartphone to couple to the peripheral equipment. The first smartphone 30a may therefore secure coupling to the peripheral equipment 3.

Next, the first smartphone 30a obtains desired data (video data or the like) from the peripheral equipment 3 (step S83), and transmits the obtained data to the server 10 (step S84).

At a time of completion of the coupling, the peripheral equipment 3 updates the access key by using the access key for the next time, the access key for the next time being received from the server 10 (step S85). In response to this, the server 10 updates the access key for this time (step S86). A secure system resistant to leakage of the access key may be constructed by thus updating the access key.

Incidentally, the access processing during the detection processing according to the present embodiment has been described as processing in a case where it becomes desirable to couple to the peripheral equipment 3. However, without being limited to this, the access processing during the detection processing according to the present embodiment may be used also in a case where it becomes desirable to couple to the unreached smartphone.

Figure 26:
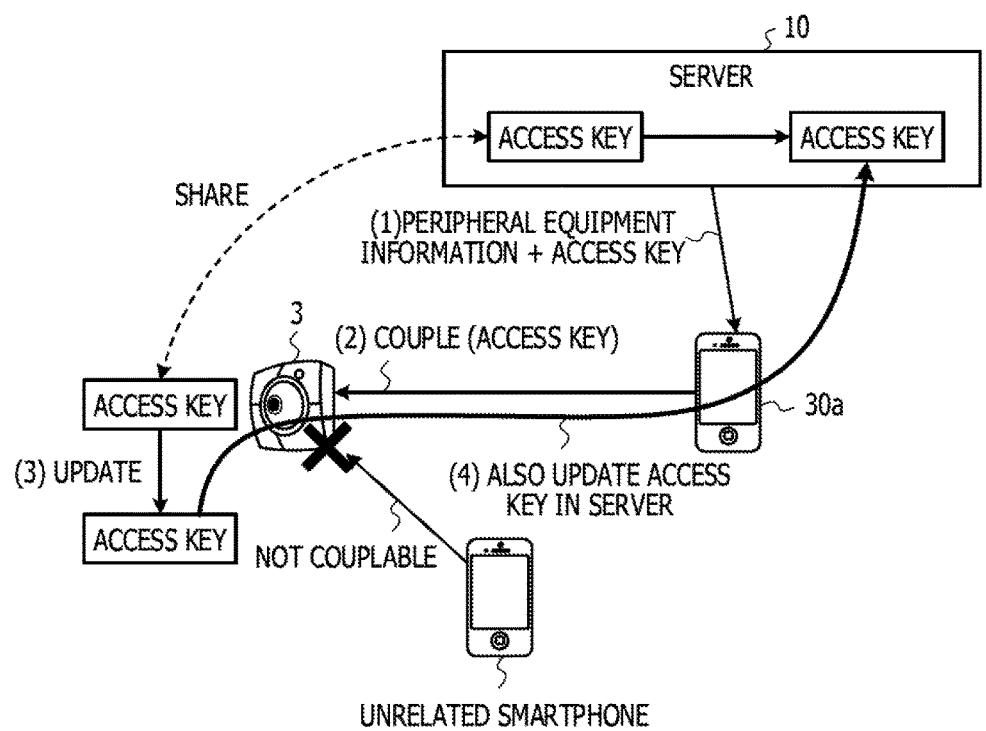
FIG. 26 is a diagram of assistance in explaining detection processing according to the fourth embodiment.

An example of the above-described action will be described with reference to FIG. 26.

(1) The server 10 transmits the peripheral equipment information and the access keys (for this time and the next time) to the first smartphone 30a, and shares these pieces of information.

(2) The first smartphone 30a couples to the peripheral equipment 3 specified by the peripheral equipment information by using the access key for this time. The unrelated smartphone does not have the access key for this time, so that it is difficult for the unrelated smartphone to couple to the peripheral equipment 3.

(3) The peripheral equipment 3 updates the access key to the access key for the next time at a time of completion of the coupling to the first smartphone 30a. For example, the access key for the next time, which access key is transmitted from the server 10, is an access key at a next time of access.

(4) The peripheral equipment 3 transmits information about the access key updated in the peripheral equipment 3 to the server 10. The access key for this time in the server 10 is thereby updated.

It is consequently difficult for the unrelated smartphone to couple to the peripheral equipment 3 or the like. In addition, a secure system resistant to leakage of the access key may be constructed by updating the access key each time coupling is completed.

As described above, according to the detecting systems 1 in accordance with the first to fourth embodiments, the accuracy of search for the detection target T may be improved by utilizing data obtained by the peripheral equipment 3 or the like such as a neighboring fixed camera as well as the smartphone 30 coupled to the server 10. In addition, when the smartphone 30 that has accepted an instruction to couple from the server 10 couples to only the desired peripheral equipment 3, and obtains data in a range indicated by the accepted instruction, the peripheral equipment 3 may be utilized safely and efficiently.

Figure 27:
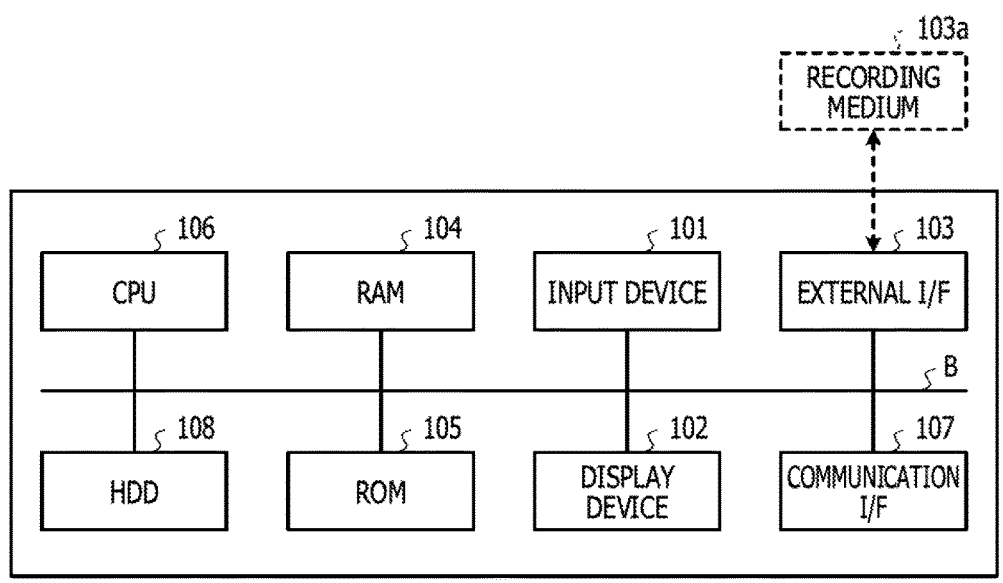
FIG. 27 is a diagram illustrating an example of hardware configuration of a server according to one embodiment.

Lastly, an example of hardware configuration of a server 10 according to one embodiment will be described with reference to FIG. 27. The server 10 includes an input device 101, a display device 102, an external interface (I/F) 103, a random access memory (RAM) 104, a read only memory (ROM) 105, a CPU 106, a communication I/F 107, and a hard disk drive (HDD) 108, which are each coupled mutually by a bus B.

The input device 101 includes a keyboard or a mouse. The input device 101 is used to input various operation signals to the server 10. The display device 102 includes a display. The display device 102 displays various kinds of processing results. The communication I/F 107 is an interface for coupling the server 10 to a network. The server 10 may thereby perform data communication with a smartphone 30 and other equipment via the communication I/F 107.

The HDD 108 is a nonvolatile storage device that stores a program and data. The stored program and the stored data include basic software controlling the whole of the server 10 and application software. The HDD 108 may, for example, store various kinds of databases, a detection processing program, and the like.

The external I/F 103 is an interface with an external device. The external device includes a recording medium 103a. The server 10 may thereby read and/or write the recording medium 103a via the external I/F 103. The recording medium 103a includes a compact disk (CD) and a digital versatile disk (DVD) as well as a secure digital memory card (SD memory card), and a universal serial bus memory (USB memory).

The ROM 105 is a nonvolatile semiconductor memory (storage device) that may retain internal data even after power is turned off. The ROM 105 stores a program and data for network settings or the like. The RAM 104 is a volatile semiconductor memory (storage device) that temporarily retains a program and data. The CPU 106 is an arithmetic unit that implements control of the whole of the apparatus and incorporated functions by reading a program and data from the above-described storage device (for example, the "HDD 108" or the "ROM 105") into the RAM 104, and performing processing.

With such a configuration, in the server 10 according to the present embodiment, the CPU 106 performs detection processing using data and a program stored within the ROM 105 or the HDD 108. Incidentally, information stored in various kinds of tables may be stored in the RAM 104, the HDD 108, a cloud server coupled to the server 10 via a network, or the like.

An information processing device, an information processing method, an information processing program, and an information processing system have been described above based on the foregoing embodiments. However, the information processing device, the information processing method, the information processing program, and the information processing system according to the present technology are not limited to the foregoing embodiments, but are susceptible of various modifications and improvements within the scope of the present technology. In addition, when a plurality of the foregoing embodiments and modifications are present, the embodiments and the modifications may be combined with each other within a scope where no inconsistency arises.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device for providing service of search for a beacon device, the information processing device comprising:
a memory;
a processor coupled to the memory and configured to
execute a reception processing that includes receiving detection information from any of a plurality of terminal devices, each of the plurality of terminal devices being configured to detect a beacon signal sent from a beacon device, the detection information including a first position corresponding to a position where the any of the plurality of terminal devices detects the beacon signal from the beacon device,
execute a specification processing when the information processing device detects that a first condition is filled, the specification processing including selecting any of a plurality of input devices, the first condition being configured to be filled when the information processing device does not receive the detection information from any of the plurality of terminal devices for a given time, each of the plurality of input devices being configured to obtain peripheral information representing a situation around the each of the plurality of input devices, the selected input device being present in a second position at a time when the specification processing is executed, the second position being a position beyond a first area formed by the plurality of terminal devices, the first area being an area where at least one of the plurality of terminal devices receives the beacon signal if the beacon device is present in the first area, execute a notification processing that includes transmitting coupling information to a first terminal device selected from among the plurality of the terminal devices, the first terminal device being present in a third position at a time when the notification processing is executed, the third position being a position communicable between the first terminal device and the selected input device, the coupling information being configured to cause the first terminal device to obtain the peripheral information from the selected input device by using the coupling information, and receiving from the first terminal device the peripheral information obtained by the selected input device, and execute a transmission processing that includes transmitting the received peripheral information to a given device.

2. The information processing device according to claim 1, wherein the reception processing includes accumulating, into a storage, one or more of the detection information received from one or more of the plurality of terminal devices, wherein the processor is further configured to execute an estimation processing that includes estimating a position of the beacon device based on the one or more of the detection information accumulated in the storage.

3. The information processing device according to claim 2, wherein the transmission processing is configured to, when a notification is received from the device to which the peripheral information is transmitted, cause a first input device to output a message, the notification indicating that the peripheral information is related to the beacon device, the first input device being any of the plurality of input devices and being present in a vicinity of the estimated position of the beacon device.

4. The information processing device according to claim 1, wherein the processor is further configured to execute a second transmission processing that includes transmitting a request to detect the beacon signal to the plurality of the terminal devices when a request to search for the beacon device is received, and the reception processing is configured to receive the detection information obtained by a third terminal device via a fourth terminal device, the third terminal device being a terminal device not receiving the detection request among the plurality of the terminal devices, the fourth terminal device being a terminal device receiving the detection request among the plurality of the terminal devices.

5. The information processing device according to claim 1, wherein the processor is configured to execute a switching processing that includes, when no detection information is received from any of the plurality of the terminal devices for a given time, transmitting a request to switch an operation mode of each of the plurality of the terminal devices to a search continuation mode in which the detection information is transmitted in real time, and the reception processing is configured to receive the detection information from one or more of the plurality of the terminal devices in real time after the plurality of the terminal devices are switched to the search continuation mode.

6. A method, performed by an information processing device, for providing service of search for a beacon device, the method comprising:

executing, by a processor of the information processing device, a reception processing that includes receiving detection information from any of a plurality of terminal devices, each of the plurality of terminal devices being configured to detect a beacon signal sent from a beacon device, the detection information including a first position corresponding to a position where the any of the plurality of terminal devices detects the beacon signal from the beacon device;

executing, by the processor, a specification processing when the information processing device detects that a first condition is filled, the specification processing including selecting any of a plurality of input devices when a first condition is filled, the first condition being configured to be filled when the information processing device does not receive the detection information from any of the plurality of terminal devices for a given time, each of the plurality of input devices being configured to obtain peripheral information representing a situation around the each of the plurality of input devices, the selected input device being present in a second position at a time when the specification processing is executed, the second position being a position beyond a first area formed by the plurality of terminal devices, the first area being an area where at least one of the plurality of the terminal devices receives the beacon signal if the beacon device is present in the first area;

executing, by the processor, a notification processing that includes transmitting coupling information to a first terminal device from among the plurality of the terminal devices, the first terminal device being present in a third position at a time when the notification processing is executed, the third position being a position communicable between the first terminal device and the selected input device, the coupling information being configured to cause the first terminal device to obtain the peripheral information from the selected input device by using the coupling information, and receiving from the first terminal device the peripheral information obtained from the selected input device; and executing, by the processor, a transmission processing that includes transmitting the received peripheral information to a given device.

7. The method according to claim 6, wherein the reception processing includes accumulating, into a storage, one or more of the detection information received from one or more of the plurality of terminal devices, wherein the method further comprises executing an estimation processing that includes estimating a position of the beacon device based on the one or more of the detection information accumulated in the storage.

8. The method according to claim 7, wherein
the transmission processing is configured to, when a notification is received from the device to which the peripheral information is transmitted, cause a first input device to output a message, the notification indicating that the peripheral information is related to the beacon device, the first input device being any of the plurality of input devices and being present in a vicinity of the estimated position of the beacon device.

9. The method according to claim 6,
the method further comprising: executing a second transmission processing that includes transmitting a request to detect the beacon signal to the plurality of the terminal devices when a request to search for the beacon device is received,
wherein the reception processing is configured to receive the detection information obtained by a third terminal device via a fourth terminal device, the third terminal device being a terminal device not receiving the detection request among the plurality of the terminal devices, the fourth terminal device being a terminal device receiving the detection request among the plurality of the terminal devices.

10. The method according to claim 6,
the method further comprising: executing a switching processing that includes, when no detection information is received from any of the plurality of the terminal devices for a given time, transmitting a request to switch an operation mode of each of the plurality of the terminal devices to a search continuation mode in which the detection information is transmitted in real time,
wherein the reception processing is configured to receive the detection information from one or more of the plurality of the terminal devices in real time after the plurality of the terminal devices are switched to the search continuation mode.

11. A non-transitory computer-readable storage medium storing a program that causes a computer to execute a process, the process comprising:
executing a reception processing that includes receiving detection information from any of a plurality of terminal devices, each of the plurality of terminal devices being configured to detect a beacon signal sent from a beacon device, the detection information including a first position corresponding to a position where the any of the plurality of terminal devices detects the beacon signal from the beacon device;
executing a specification processing when the computer detects that a first condition is filled, the specification processing including selecting any of a plurality of input devices, the first condition being configured to be filled when the computer does not receive the detection information is received from any of the plurality of terminal devices for a given time, each of the plurality of input devices being configured to obtain peripheral information representing a situation around the each of the plurality of input devices, the selected input device being present in a second position at a time when the specification processing is executed, the second position being a position beyond a first area formed by the plurality of terminal devices, the first area being an area where at least one of the plurality of the terminal devices receives the beacon signal if the beacon device is present in the first area;
executing a notification processing that includes
transmitting coupling information to a first terminal device selected from among the plurality of the terminal devices, the first terminal device being present in a third position at a time when the notification processing is executed, the third position being a position communicable between the first terminal device and the selected input device, the coupling information being configured to cause the first terminal device to obtain the peripheral information from the selected input device by using the coupling information, and
receiving from the first terminal device the peripheral information obtained by the selected input device; and
executing a transmission processing that includes transmitting the received peripheral information to a given device.

12. The storage medium according to claim 11,
wherein the reception processing includes accumulating, into a storage, one or more of the detection information received from one or more of the plurality of terminal devices,
wherein the process further comprises executing an estimation processing that includes estimating a position of the beacon device based on the one or more of the detection information accumulated in the storage.

13. The storage medium according to claim 12, wherein
the transmission processing is configured to, when a notification is received from the device to which the peripheral information is transmitted, cause a first input device to output a message, the notification indicating that the peripheral information is related to the beacon device, the first input device being any of the plurality of input devices and being present in a vicinity of the estimated position of the beacon device.

14. The storage medium according to claim 11,
the process further comprising: executing a second transmission processing that includes transmitting a request to detect the beacon signal to the plurality of the terminal devices when a request to search for the beacon device is received,
wherein the reception processing is configured to receive the detection information obtained by a third terminal device via a fourth terminal device, the third terminal device being a terminal device not receiving the detection request among the plurality of the terminal devices, the fourth terminal device being a terminal device receiving the detection request among the plurality of the terminal devices.

15. The storage medium according to claim 11,
the process further comprising: executing a switching processing that includes, when no detection information is received from any of the plurality of the terminal devices for a given time, transmitting a request to switch an operation mode of each of the plurality of the terminal devices to a search continuation mode in which the detection information is transmitted in real time,
wherein the reception processing is configured to receive the detection information from one or more of the plurality of the terminal devices in real time after the plurality of the terminal devices are switched to the search continuation mode.

16. An information processing system comprising:
a plurality of terminal devices configured to detect a beacon signal transmitted from a beacon device; and an information processing device configured to provide service of search for the beacon device, wherein each of the plurality of the terminal devices is configured to transmit detection information to the information processing device, the detection information including a first position corresponding to a position where the each of the plurality of terminal devices detects the beacon signal from the beacon device, wherein the information processing device is configured to execute a reception processing that includes receiving the detection information from any of a plurality of terminal devices, execute a specification processing when the information processing device detects that a first condition is filled, the specification processing including selecting any of a plurality of input devices, the first condition being configured to be filled when the information processing device does not receive detection information from any of the plurality of terminal devices for a given time, each of the plurality of input devices being configured to obtain peripheral information representing a situation around the each of the plurality of input devices, the selected input device being present in a second position at a time when the specification processing is executed, the second position being a position beyond a first area formed by the plurality of terminal devices, the first area being an area where at least one of the plurality of the terminal devices receives the beacon signal if the beacon device is present in the first area, execute a notification processing that includes transmitting coupling information to a first terminal device selected from among the plurality of the terminal devices, the first terminal device being present in a third position at a time when the notification processing is executed, the third position being a position communicable between the first terminal device and the selected input device, the coupling information being configured to cause the first terminal device to obtain the peripheral information from the selected input device by using the coupling information, and receiving from the first terminal device the peripheral information obtained by the selected input device, and execute a transmission processing that includes transmitting the received peripheral information to a given device.

17. The information processing system according to claim 16, wherein the reception processing includes accumulating, into a storage, one or more of the detection information received from one or more of the plurality of terminal devices, wherein the information processing device is further configured to execute an estimation processing that includes estimating a position of the beacon device based on the one or more of the detection information accumulated in the storage.

18. The information processing system according to claim 17, wherein the transmission processing is configured to, when a notification is received from the device to which the peripheral information is transmitted, cause a first input device to output a message, the notification indicating that the peripheral information is related to the beacon device, the first input device being any of the plurality of input devices and being present in a vicinity of the estimated position of the beacon device.

19. The information processing system according to claim 16, wherein the information processing device is further configured to execute a second transmission processing that includes transmitting a request to detect the beacon signal to the plurality of the terminal devices when a request to search for the beacon device is received, and the reception processing is configured to receive the detection information obtained by a third terminal device via a fourth terminal device, the third terminal device being a terminal device not receiving the detection request among the plurality of the terminal devices, the fourth terminal device being a terminal device receiving the detection request among the plurality of the terminal devices.

20. The information processing system according to claim 16, wherein the information processing device is further configured to execute a switching processing that includes, when no detection information is received from any of the plurality of the terminal devices for a given time, transmitting a request to switch an operation mode of each of the plurality of the terminal devices to a search continuation mode in which the detection information is transmitted in real time, and the reception processing is configured to receive the detection information from one or more of the plurality of the terminal devices in real time after the plurality of the terminal devices are switched to the search continuation mode.

* * * * *